(12) United States Patent
Handa et al.

(10) Patent No.: US 12,275,146 B2
(45) Date of Patent: Apr. 15, 2025

(54) SIMULATION OF TASKS USING NEURAL NETWORKS

(71) Applicant: NVIDIA Corporation, Santa Clara, CA (US)

(72) Inventors: Ankur Handa, Seattle, WA (US); Viktor Makoviichuk, San Jose, CA (US); Miles Macklin, Auckland (NZ); Nathan Ratliff, Seattle, WA (US); Dieter Fox, Seattle, WA (US); Yevgen Chebotar, Los Angeles, CA (US); Jan Issac, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 450 days.

(21) Appl. No.: 16/372,274

(22) Filed: Apr. 1, 2019

(65) Prior Publication Data

US 2020/0306960 A1    Oct. 1, 2020

(51) Int. Cl.
*G05B 13/04*        (2006.01)
*B25J 9/16*         (2006.01)
(Continued)

(52) U.S. Cl.
CPC ............ *B25J 9/163* (2013.01); *B25J 9/1605* (2013.01); *G05B 13/0265* (2013.01);
(Continued)

(58) Field of Classification Search
CPC ..... B25J 9/163; B25J 9/1605; G05B 13/0265; G05B 13/042; G05B 2219/50391;
(Continued)

(56) References Cited

U.S. PATENT DOCUMENTS 5,598,076 A * 1/1997 Neubauer ................ B25J 9/161
                                                318/568.22
7,372,583 B1 * 5/2008 Jin ....................... G03F 7/70491
                                                702/179
(Continued)

FOREIGN PATENT DOCUMENTS

CN        102695953 B  *  5/2015  ............. G01N 33/22
CN        106777777 A  *  5/2017
(Continued)

OTHER PUBLICATIONS

CN106874616A. English.translate; Luo Xishuang; Beijing Hirain Tech CO LTD; Parameter optimization adjusting method and system (Year: 2017).*

(Continued)

*Primary Examiner* — B M M Hannan
(74) *Attorney, Agent, or Firm* — Davis Wright Tremaine LLP

(57) ABSTRACT

A machine-learning control system is trained to perform a task using a simulation. The simulation is governed by parameters that, in various embodiments, are not precisely known. In an embodiment, the parameters are specified with an initial value and expected range. After training on the simulation, the machine-learning control system attempts to perform the task in the real world. In an embodiment, the results of the attempt are compared to the expected results of the simulation, and the parameters that govern the simulation are adjusted so that the simulated result matches the real-world attempt. In an embodiment, the machine-learning control system is retrained on the updated simulation. In an embodiment, as additional real-world attempts are made, the simulation parameters are refined and the control system is retrained until the simulation is accurate and the control (Continued)

system is able to successfully perform the task in the real world.

20 Claims, 13 Drawing Sheets

(51) Int. Cl.
 *G05B 13/02* (2006.01)
 *G05D 1/00* (2006.01)
(52) U.S. Cl.
 CPC ......... *G05B 13/042* (2013.01); *G05D 1/0088* (2013.01); *G05B 2219/50391* (2013.01)
(58) Field of Classification Search
 CPC ............... G05B 13/027; G05D 1/0088; G05D 2201/0213; G06N 20/00
 USPC ............................................. 700/30, 31, 246
 See application file for complete search history.

(56) References Cited

U.S. PATENT DOCUMENTS

| | | | | |
|---|---|---|---|---|
| 7,567,352 B2* | 7/2009 | Jin | ...................... | G03F 7/70491 |
| | | | | 702/179 |
| 9,811,074 B1 | 11/2017 | Aichele et al. | | |
| 10,379,988 B2* | 8/2019 | Kochunni | ........... | G06F 11/3461 |
| 10,599,155 B1* | 3/2020 | Konrardy | ........... | B60W 60/0011 |
| 10,657,839 B2* | 5/2020 | Becker | ..................... | B23K 9/32 |
| 10,766,137 B1* | 9/2020 | Porter | ..................... | B25J 9/1671 |
| 10,792,810 B1* | 10/2020 | Beckman | ................. | B25J 9/163 |
| 10,800,040 B1* | 10/2020 | Beckman | ............... | B25J 9/1605 |
| 10,909,744 B1* | 2/2021 | Stuyck | ................... | G06N 3/045 |
| 10,926,408 B1* | 2/2021 | Vogelsong | ............... | B25J 9/163 |
| 11,135,722 B2* | 10/2021 | Atohira | .................. | B25J 9/1605 |
| 2008/0059141 A1* | 3/2008 | Finarov | ..................... | G03F 1/84 |
| | | | | 703/13 |
| 2008/0312010 A1* | 12/2008 | Marty | ..................... | H04N 23/80 |
| | | | | 73/865.4 |
| 2010/0256961 A1* | 10/2010 | Bush | ....................... | G01C 23/00 |
| | | | | 703/8 |
| 2011/0276150 A1* | 11/2011 | Al-Duwaish | ........ | G05B 13/027 |
| | | | | 700/28 |
| 2011/0307424 A1* | 12/2011 | Jin | ......................... | G06N 20/00 |
| | | | | 706/12 |
| 2012/0008147 A1* | 1/2012 | Finarov | ................... | H01L 22/20 |
| | | | | 356/601 |
| 2013/0065682 A1* | 3/2013 | Izuno | .................. | A63F 13/5252 |
| | | | | 463/31 |
| 2013/0346348 A1* | 12/2013 | Buehler | ............... | G05B 19/423 |
| | | | | 706/12 |
| 2014/0092253 A1* | 4/2014 | Marty | ................ | A63B 69/0071 |
| | | | | 473/448 |
| 2015/0332450 A1* | 11/2015 | Marty | ................ | A63B 24/0021 |
| | | | | 348/157 |
| 2017/0046974 A1* | 2/2017 | Becker | .................. | G09B 19/24 |
| 2017/0166216 A1* | 6/2017 | Rander | .................. | G05D 1/0088 |
| 2017/0167881 A1* | 6/2017 | Rander | .................. | G05D 1/0214 |
| 2017/0168489 A1* | 6/2017 | Rander | .................. | G01C 21/32 |
| 2017/0232515 A1* | 8/2017 | DeMuth | .................. | B22F 10/80 |
| | | | | 419/53 |
| 2018/0025951 A1* | 1/2018 | Kuboi | .................... | H01L 22/20 |
| | | | | 438/7 |
| 2018/0056434 A1* | 3/2018 | Aoki | .................... | B23K 11/255 |
| 2018/0089553 A1 | 3/2018 | Liu et al. | | |
| 2018/0345496 A1 | 12/2018 | Li et al. | | |
| 2018/0349527 A1* | 12/2018 | Li | ........................... | G06T 17/00 |
| 2018/0357552 A1* | 12/2018 | Campos | ................. | G06N 5/043 |
| 2019/0034843 A1* | 1/2019 | Mehrotra | ........... | G06Q 10/0631 |
| 2019/0084151 A1* | 3/2019 | Bai | ........................ | B25J 9/1612 |
| 2019/0091859 A1 | 3/2019 | Wen et al. | | |
| 2019/0201081 A1* | 7/2019 | Shelton, IV | ....... | A61B 18/1445 |
| 2019/0228495 A1* | 7/2019 | Tremblay | .............. | G06T 1/0014 |
| 2019/0236353 A1* | 8/2019 | Nakata | .................... | G06N 20/00 |
| 2019/0378005 A1* | 12/2019 | O'Sullivan | ............. | B63B 21/50 |
| 2020/0016745 A1* | 1/2020 | Tang | ................... | B25J 11/0005 |
| 2020/0030988 A1* | 1/2020 | Anderson | .............. | B25J 11/001 |
| 2020/0114506 A1* | 4/2020 | Toshev | ................... | B25J 9/1697 |
| 2020/0156243 A1* | 5/2020 | Ghare | ................. | G06F 11/3466 |
| 2020/0159175 A1* | 5/2020 | Watanabe | .............. | G05D 1/101 |
| 2020/0159648 A1* | 5/2020 | Ghare | ..................... | H04L 63/10 |
| 2020/0171653 A1* | 6/2020 | Holson | ................ | G05D 1/0246 |
| 2020/0279134 A1* | 9/2020 | Bousmalis | ............ | G06N 3/084 |
| 2020/0309994 A1* | 10/2020 | Eckel | ........................ | G06N 5/04 |
| 2020/0368906 A1* | 11/2020 | Tozeto Ramos | ....... | G06N 3/084 |
| 2020/0409317 A1* | 12/2020 | Kimura | .................. | B25J 9/1671 |
| 2021/0033589 A1* | 2/2021 | Tufillaro | ............... | G01J 3/0289 |
| 2021/0357556 A1* | 11/2021 | Venkatapurapu | .... | G06K 9/6262 |
| 2023/0045798 A1* | 2/2023 | Kim | ........................ | G01S 13/88 |

FOREIGN PATENT DOCUMENTS

| | | | | |
|---|---|---|---|---|
| CN | 106874616 A | * | 6/2017 | ............. G06F 30/15 |
| CN | 107871160 A | | 4/2018 | |
| CN | 109033589 A | * | 12/2018 | ......... G06F 17/5009 |
| EP | 3742343 A1 | * | 11/2020 | .............. B25J 9/163 |
| EP | 3768398 B1 | * | 12/2023 | ........... A61B 5/1122 |
| JP | 3521653 B2 | * | 4/2004 | |
| JP | 2008033608 A | * | 2/2008 | |
| JP | 2008065588 A | * | 3/2008 | |
| JP | 2010110724 A | * | 5/2010 | |
| JP | 7220921 B2 | * | 2/2023 | |
| WO | WO-2020098918 A1 | * | 5/2020 | .............. B25J 9/163 |

OTHER PUBLICATIONS

JP2008065588A. English.translate; Fukano; Yokogawa Electric Corp; Parameter Adjustment Device of Plant Model. (Year: 2008).*
JP2008033608. English.translate Parameter Adjustment Unit in Plant Model (Year: 2008).*
Article 67(3) EPC Communication mailed Oct. 9, 2020, European Patent Application No. 20161195.1, 2 pages.
Communication Pursuant to Rule 69 EPC, mailed Oct. 12, 2020, European Patent Application No. 20161195.1, 2 pages.
Extended European Search Report mailed Aug. 26, 2020, European Patent Application No. 20161195.1, 7 pages.
IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.
Office Action for Chinese Application No. 202010237312.X, mailed Jun. 5, 2024, 8 pages.
Office Action for Chinese Application No. 202010237312.X, mailed Feb. 9, 2025, 20 pages.

* cited by examiner

Simulation Parameters

|  | Allowed Range | | Parameter Values | |
| --- | --- | --- | --- | --- |
|  | Minimum | Maximum | Initial Value | Current Value |
| Air Resistance | 0.032 | 0.038 | 0.035 | 0.0356 |
| Air Density | 12.43 | 15.23 | 13.5 | 13.53 |
| Wind | 0 | 6 | 0 | 0.021 |
| String Mass | 3 | 5 | 3.4 | 4.1 |
| String Flexibility | 10 | 17 | 15 | 13.2 |
| String Length | 16 | 20 | 16 | 17.2 |
| String Width | 0.7 | 1.0 | 0.74 | 0.72 |
| Cup Diameter | 10 | 12 | 11 | 11.3 |
| Cup Mass | 15 | 20 | 15 | 15.5 |
| Cup Height | 4 | 6.5 | 5 | 6.1 |
| Cup Position | 5 | 15 | 7 | 11.1 |
| Cup Angle | 175 | 185 | 180 | 182 |
| Ball Mass | 4 | 5 | 4 | 4.4 |
| Ball Diameter | 6 | 7 | 6.5 | 6.55 |

FIG. 4

SIMULATION OF TASKS USING NEURAL NETWORKS

BACKGROUND

Machine learning systems are a recent innovation in control systems. In general, machine learning systems learn a behavior based on training data. In various examples, machine learning systems are programmed by providing vast amounts of training data to the system, and the system uses the training data to adjust the parameters of the system and improve the system's accuracy. The resulting accuracy of the system is dependent on the quality, and to some extent, quantity of the training data used. Therefore, creating systems that generate large amounts of accurate training data is an important problem.

BRIEF DESCRIPTION OF THE DRAWINGS

Various techniques will be described with reference to the drawings, in which:

FIG. 4 illustrates an example of parameter ranges and values that can be applied to a simulation, in an embodiment;

DETAILED DESCRIPTION

Figure 1:
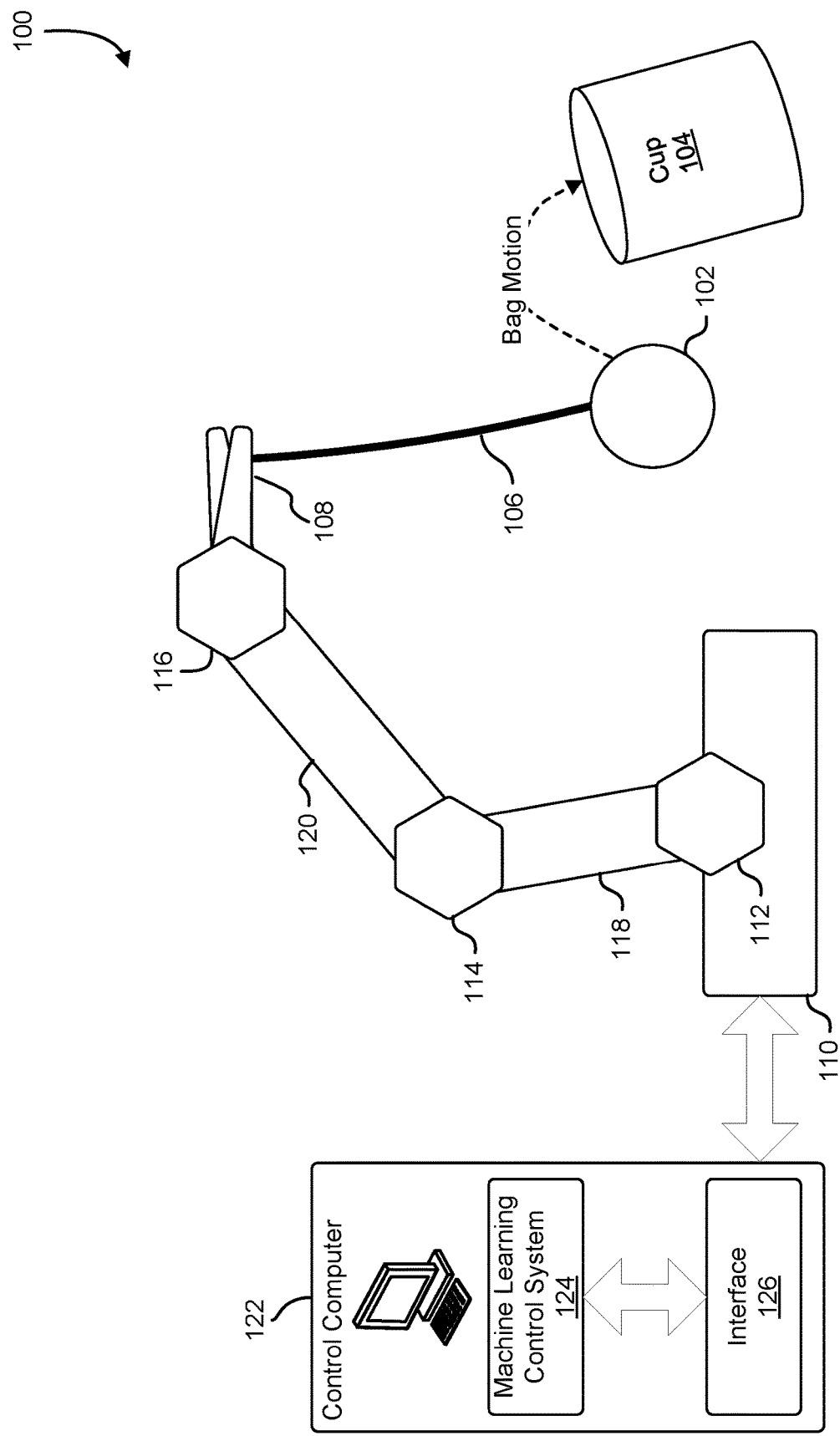
FIG. 1 illustrates an example of a computer-controlled robot performing a task, in an embodiment.

The present document describes a machine-learning control system that learns to perform a task by iteratively refining an accurate simulation of the task, and using the refined simulation to provide improved teaching to the control system. In an embodiment, a simulation of a task is generated where the simulation is governed by a set of parameters that are not precisely known. In an embodiment, an initial value and allowed range for each parameter in the set of parameters is obtained, and the initial value is used as an initial calibration for the simulation. In an embodiment, the machine-learning control system is trained using the simulation until the machine-learning control system is able to successfully perform the task. In an embodiment, the machine-learning control system then attempts to perform the task in the real world. In an embodiment, if the real world result does not match the result predicted by the simulation, the set of parameters that govern the simulation are adjusted so that the simulation results matched the observed real world result. In an embodiment, the machine-learning control system is retrained using the adjusted simulation. In an embodiment, after retraining, a further attempt is made to perform the task in the real world. In an embodiment, the process of adjusting the simulation to match real world results and retraining the control system is repeated until the control system is able to successfully perform the task in the real world.

In an embodiment, the task includes parameters that are not directly or easily measurable. In an embodiment, for example, the task involves tossing an object that is attached to a string, and in order to accurately simulate the task, a measure of the stiffness of the string must be entered into the simulation. In an embodiment, the measure is estimated with an initial value and range, and the system determines a reasonable value for the measure by comparing the results of the simulation to real world results from attempting the task. In an embodiment, since the precise initial value is not required, expensive, time-consuming, and difficult measurements need not be precisely obtained.

In an embodiment, the parameters that control the simulation are adjusted in response to a failed attempt at performing task in the real world. In an embodiment, the system tests the simulation using combinations of parameters selected to be in accordance with the allowed range of each parameter, and assigns a score to each set of parameters based on the similarity between real-world result data collected as a result of real-world attempts and results predicted by the simulator. In an embodiment, the system selects a particular set of parameters that maximizes the similarity between simulation-predicted results and the real-world attempts. In an embodiment, the score is used to generate an error signal that is minimized over the set of simulation parameters using a least mean square ("LMS") optimization algorithm.

In an embodiment, the machine-learning control system is implemented as a neural network, structured prediction system, anomaly detection system, supervised learning system, or artificial intelligence system. In an embodiment, the parameters that govern the simulation are iteratively adjusted in response to attempts to perform a task in the real-world. In an embodiment, adjustments to simulation parameters cause a corresponding adjustment in policies learned by the machine learning control system which ultimately lead to an alignment between simulated results and real-world results. In an embodiment, adjustment of simulation parameters can occur iteratively until real-world behavior is acceptable. In an embodiment, results of failed attempts, in addition to successes are used to adjust simulation parameters.

In an embodiment, various parameters of the simulation are estimated, and are learned by the system using measured differences between simulated results and actual real-world attempt results. In an embodiment, for example, the system is initialized with an estimate of friction, and learns an accurate version of friction over time. In an embodiment, this obviates the need to measure friction precisely. In an embodiment, the system uses the real world failed attempts to make a sensible prediction of various parameters via a metric cost function that measures the discrepancy of the simulated result and the real-world result. In an embodiment, the system samples a large collection of simulated trajectories to determine which simulated trajectories most closely resemble the real world trajectories, and based on the degree of resemblance, the system adjusts the simulation parameters accordingly.

In an embodiment, the system can be applied to a variety of different tasks where one or more parameters is unknown or difficult to measure such as, opening a drawer, manipulating an object on a string, or swinging an object into a cup. In an embodiment, the system provides for increased accuracy of the simulation by tuning the simulation parameters based on failed real-world attempts. In an embodiment, data acquired from failed attempts is used to adjust the distribution of simulation parameters to make sure the simulated scene accurately reflects the real world environment. As a result, various embodiments are able to automate the tuning of simulation parameters, and operate on scenarios where some state variables are not easily observable.

As one skilled in the art will appreciate in light of this disclosure, certain embodiments may be capable of achieving certain advantages, including some or all of the following: (1) less reliance on the measurement of simulation parameters, (2) control system training that does not require as many real-world attempts, (3) the production of an accurate simulation that can be used for other purposes.

FIG. 1 illustrates an example of a computer-controlled robot performing a task, in an embodiment. In an embodiment, FIG. 1 depicts an example 100 of a computer-controlled robot 110 performing a task comprising placing a bag 102 into the cup 104. In an embodiment, the computer-controlled robot 110 is controlled by the control computer 122, which comprises a machine learning control system 124 and interface 126. In an embodiment, the control computer 122 can be any suitable system, such as a computer system and/or graphics system. In an embodiment, a computer system can comprise one or more instances of a physical computing instance, such as a physical computer or device, or one or more instances of a virtual computing instance, such as a virtual machine, which can be hosted on one or more computer servers. Additionally, in an embodiment, a computer system can comprise various components and/or subsystems, such as one or more processors, memory storing instructions executable by the one or more processors, graphics subsystems, and/or variations thereof.

In an embodiment, a graphics system is a system that can exist on a computer system and/or other system to provide processing capabilities, specifically the processing of graphics through the usage of a graphics processing unit, although other processes can be performed by the graphics system. In an embodiment, a graphics system can comprise one or more variations of discrete and/or integrated graphics systems. In an embodiment, an integrated graphics system is a graphics system comprising memory shared with a processing unit of another system to perform and execute various processes. A discrete graphics system, in an embodiment, is a graphics system comprising memory separate from memory utilized by processing units of other systems. In an embodiment, a discrete graphics systems utilizes an independent source of video memory and/or other memory types to perform and execute processes. In an embodiment, the system can be a parallel processing unit ("PPU") or a general processing cluster ("GPC").

In an embodiment, the control computer 122 comprises a machine learning control system 124. In an embodiment, the machine learning control system 124 comprises a control system. In an embodiment, a control system is a system that regulates, manages, and controls a system, such as the computer-controlled robot 110, utilizing control loops, feedback, and various other mechanisms. In an embodiment, the machine learning control system 124 can comprise various control schemes such as proportional-integral-derivative ("PID") control, feedback control, logic control, linear control, and/or variations thereof. Furthermore, in an embodiment, the machine learning control system 124 can utilize various structures such as a neural network, structured prediction system, anomaly detection system, supervised learning system, artificial intelligence system, and/or variations thereof, to manage the various control schemes. In an embodiment, the machine learning control system 124 determines controls for the computer-controlled robot 110.

In an embodiment, the interface 126 comprises one or more interfaces that can facilitate communication between the control computer 122 comprising the machine learning control system 124, and the computer-controlled robot 110. In an embodiment, the interface 126 can comprise any suitable communication channel by which two or more devices can communicate, including physical network cables, wireless communications, universal serial bus ("USB"), serial, parallel, and/or variations thereof. Additionally, in an embodiment, the interface 126 can be configured to communicate through, among others, the Internet, an intranet, wide area network ("WAN"), local area network ("LAN"), and direct connection and can utilize any type of communication protocol, including a cellular wireless communications protocol, a wireless local area network ("WLAN") communications protocol, short range communications protocol, and/or variations thereof. In an embodiment, the interface 126 can utilize one or more applications and/or protocols existing on the control computer 122 to communicate with the computer-controlled robot 110.

In an embodiment, the computer-controlled robot 110 controls its structure, utilizing controls that can be determined by the machine learning control system 124, to perform the task of placing the bag 102 into the cup 104, although other tasks can also be performed. In an embodiment, the computer-controlled robot 110 comprises mechanical hinges 112, 114, and 116. In an embodiment, the mechanical hinges 112-116 comprise various mechanical features and/or measurements that can be represented by parameters. In an embodiment, these parameters can include position, such as angle relative to an X, Y, and Z axes, orientation, such as translation and/or rotation relative to an X, Y, and Z axes, rigidity, and/or variations thereof. In an embodiment, the mechanical hinges 112-116 are joined together utilizing supports 118 and 120. In an embodiment, the supports 118 and 120 comprise various mechanical features and/or measurements that can be represented by parameters. In an embodiment, these parameters can include length, location, such as position relative to an X, Y, and Z axes, rigidity, and/or variations thereof.

In an embodiment, the mechanical hinge 116 connects to a mechanical hand 108. In an embodiment, the mechanical hand 108 comprises various mechanical features and/or measurements that can be represented by parameters. In an embodiment, these parameters can include various angles of position relative to the X, Y, and Z axes, rigidity, orientation, and/or variations thereof. In an embodiment, the mechanical hand 108 connects to a string 106. In an embodiment, the string 106 comprises various mechanical features and/or measurements that can be represented by parameters. In an embodiment, these parameters can include string mass, string flexibility, string length, and string width. In an embodiment, the string 106 is attached to a bag 102. In an embodiment, the bag 102 comprises various mechanical features and/or measurements, such as mass and diameter, which can be represented by parameters. In an embodiment, the desired task of the computer-controlled robot 110 is to place the bag 102 into the cup 104. In an embodiment, the cup 104 comprises various mechanical features and/or measurements that can be represented by parameters. In an embodiment, these parameters can include diameter, mass, height, position, angle, and/or variations thereof.

It should be noted that, in an embodiment, various other parameters can represent various other mechanical features and/or measurements of the computer-controlled robot 110. In an embodiment, for example, parameters can represent measurements of the environment that comprises the computer-controlled robot 110, such as air resistance, air density, and wind. In an embodiment, the various parameters are utilized to govern simulations of the computer-controlled robot 110 performing the bag placing task. In an embodiment, the values for the parameters can be chosen and iteratively refined in a process such as the process 600 described in connection with FIG. 6.

In an embodiment, the control computer 122 utilizes the machine learning control system 124 to determine controls for the computer-controlled robot 110 to perform the bag placing task. In an embodiment, initial values for the parameters are determined by the control computer 122 to generate a simulation of the computer-controlled robot 110 performing the bag placing task. In an embodiment, the generated simulation is utilized to train the machine learning control system 124 to determine controls for the computer-controlled robot 110 to attempt to perform the bag placing task. In an embodiment, the computer-controlled robot 110 utilizes the determined controls to attempt to perform the bag placing task. In an embodiment, data relating to the inputs, outputs, and results of the attempted performance of the bag placing task is gathered. In an embodiment, the control computer 122 utilizes the gathered data from the attempted performance of the bag placing task to determine new values for the parameters of the simulation.

In an embodiment, a simulation utilizing the new values is generated to train the machine learning control system 124 to re-determine controls for the computer-controlled robot 110 to re-attempt to perform the bag placing task. In an embodiment, following the attempt, data relating to the inputs, outputs, and results of the re-attempted performance of the bag placing task is gathered and utilized by the control computer 122 and machine learning control system 124 to determine new values of the parameters for an updated simulation. In an embodiment, the updated simulation can determine new controls for a subsequent attempt to perform the bag placing task. In an embodiment, the cycle of attempting to perform the task with controls derived from determined parameters, and analyzing produced data and re-determining parameters to derive controls for the next attempt is continuously repeated until the desired results are achieved. In an embodiment, the desired results can comprise a completion of the desired task, an achievement of a measure of accuracy from the machine learning control system 124, and/or variations thereof.

Figure 2:
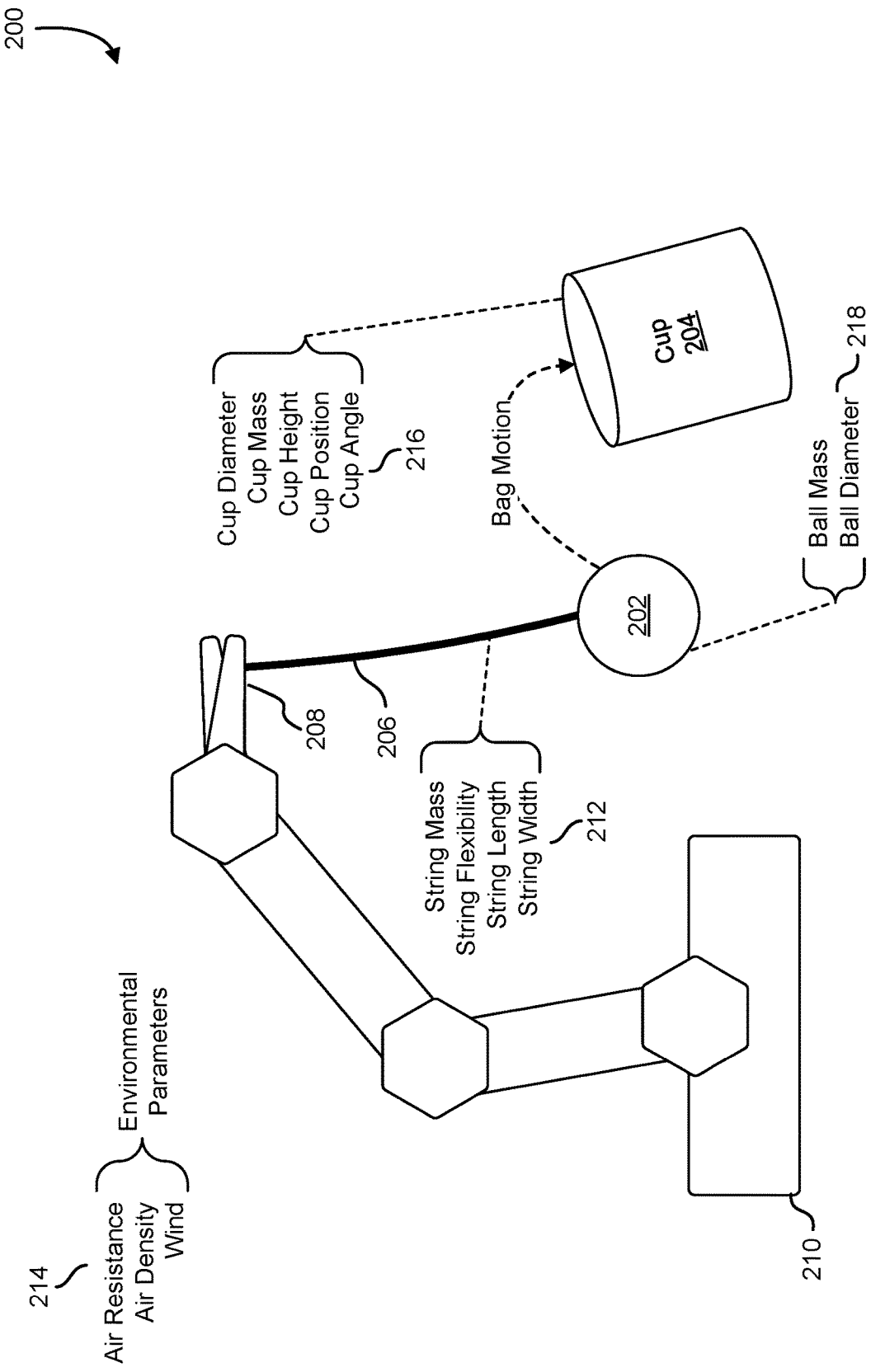
FIG. 2 illustrates an example of parameters that govern a simulated performance of a task, in an embodiment.

FIG. 2 illustrates an example of parameters that govern a simulated performance of a task, in an embodiment. In an embodiment, FIG. 2 depicts an example 200 of various parameters that dictate various aspects of a simulation comprising a simulated performance of a task. In an embodiment, the performance of the task, which comprises the computer-controlled robot 210 utilizing its various mechanisms and components (e.g., 208) to generate bag motion to place the bag 202 into the cup 204, is simulated in various simulations. In an embodiment, the computer-controlled robot 210 is the same or different as the computer-controlled robot 110 described in connection with FIG. 1.

In an embodiment, environmental parameters 214 comprising air resistance, air density, and wind govern various aspects of a simulation comprising a simulated performance of the task. In an embodiment, the environmental parameters 214 can determine various environmental aspects of the simulation. In an embodiment, for example, air resistance can determine the resistance that bag 202 and string 206 must overcome within the simulation, and air density and wind can determine various aspects of the motion of the bag 202 and the string 206 within the simulation. In an embodiment, the string parameters 212 determine various aspects of the string 206 within a simulation comprising a simulated performance of the task, such as the string mass, string flexibility, string length, and string width within the simulation. In an embodiment, the bag 202 comprises characteristics represented by the bag parameters 218, which determine various aspects of the bag 202 within a simulation comprising a simulated performance of the task, such as the mass and diameter of the bag 202 within the simulation.

In an embodiment, the cup 204 comprises characteristics represented by the cup parameters 216, which determine various aspects of the cup 204 within a simulation comprising a simulated performance of the task, such as the cup diameter, cup mass, cup height, cup position, and cup angle within the simulation. It should be noted that, in various embodiments, any number of parameters relating to any aspect of a performance of the task can be utilized to govern a simulation comprising a simulated performance of the task, such as various parameters relating to mechanical aspects of the computer-controlled robot 210, other environmental parameters, other internal/external parameters, and/or variations thereof.

In an embodiment, a performance of the task is simulated via a simulation utilizing values determined for the parameters. In an embodiment, the simulation is generated utilizing a control computer comprising a machine learning control system and interface. In an embodiment, the control computer is a system like the control computer 122 described in connection with FIG. 1. In an embodiment, the control computer comprises various systems that can generate simulations, such as the simulation engine 408 described in connection with FIG. 4. In an embodiment, the simulation can be utilized to determine controls for a real world performance of the task.

Figure 3:
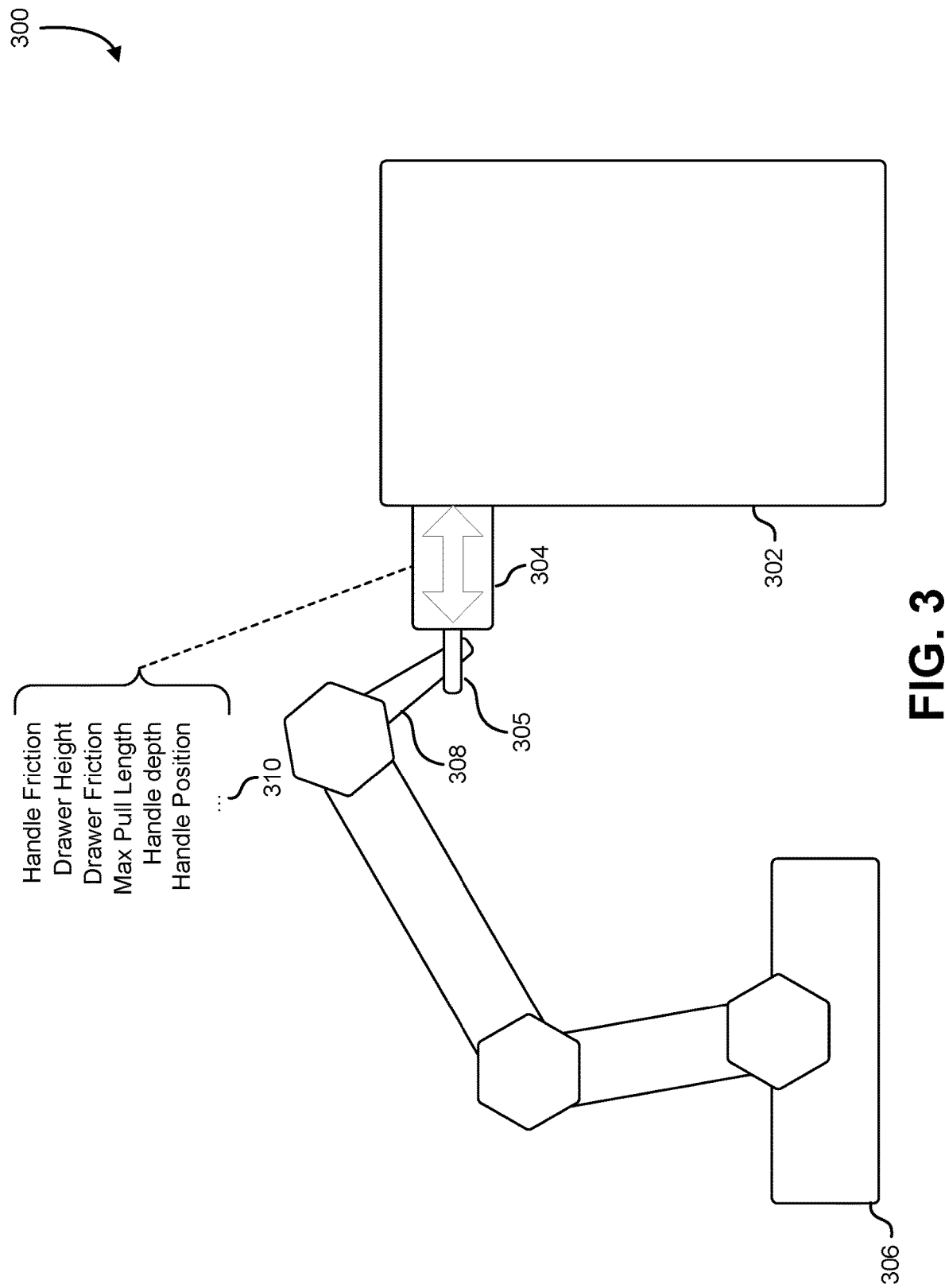
FIG. 3 illustrates an example of a computer-controlled robot performing a task of opening a drawer, in an embodiment.

FIG. 3 illustrates an example of a computer-controlled robot performing a task of opening a drawer, in an embodiment. In an embodiment, a diagram 300 illustrates a robot 306 that performs the task of opening a drawer 304. In an embodiment, the drawer 304 is mounted in a cabinet 302. In an embodiment, the drawer 304 includes a handle 305 attached to the front of the drawer. In an embodiment, the robot 306 use a probe, claw, or clamp to capture the handle 305 in an embodiment, the robot 306 manipulates the drawer by capturing the handle 305 with a probe 308.

In an embodiment, a set of physical parameters 310 govern the simulation of the drawer-opening task. In an embodiment, the set of physical parameters 310 include a drawer height, a drawer friction parameter, a full-length parameter, a handle depth parameter, and a handle position.

In an embodiment, a control system is trained in a simulation governed by the set of parameters 310 until the control system successfully directs the robot 306 to open the drawer 304. In an embodiment, the control system then directs a robot to perform the task in the real-world. Based on the results of the attempt to perform the task, the set of parameters 310 is adjusted so that the results of performing the task in the simulation match those in the real world. In an embodiment, the control system is then retrained on the updated simulation until the task again is performed successfully in the simulation. In an embodiment, further attempts are made to perform the task in the real world and the results of each attempt in the real world is used to adjust the set of parameters 310.

The task of placing a bag in a cup and opening a drawer are described in detail in the present document, but it is understood that the adaptive-simulation techniques described herein are applicable to many tasks. For example, in an embodiment, adaptive simulation techniques are applied to an autonomous driving system. In another example, embodiments may be applied to industrial control systems such as robotic welding, assembly operations, and flight control systems.

FIG. 4 illustrates an example of parameter ranges and values that can be applied to a simulation, in an embodiment. In an embodiment, FIG. 4 depicts an example 400 of parameter ranges and values that can be applied to a simulation of a task. In an embodiment, the simulation is a simulation of the computer-controlled robot 210 performing a task as described in connection with FIG. 2. In an embodiment, the simulation parameters depicted in the example 400 correspond to the parameters depicted in FIG. 2. In an embodiment, the simulation parameters can be determined by any suitable system, such as the control computer 122 described in connection with FIG. 1. In an embodiment, the simulation parameters are determined based on various aspects of the simulation. In an embodiment, the determined simulation parameters affect various aspects such as the inputs, outputs, results, and/or variations thereof of the simulation. Further information regarding the parameters of the simulation can be found in the description of FIG. 2.

In an embodiment, the allowed ranges for the simulation parameters can be determined based on various factors. In an embodiment, the allowed ranges can be determined based on results of previous simulations, historical data relating to the parameters, and/or variations thereof. In an embodiment, the allowed ranges comprise a minimum and maximum value in which the parameter values fall within. In an embodiment, an initial value is determined for each simulation parameter. In an embodiment, the initial value can be determined based on various factors, such as desired results, results of previous simulations, historical data relating to the parameters, and/or variations thereof.

In an embodiment, the initial values of the simulation parameters are utilized to generate a simulation of a task. In an embodiment, a system, like the control computer 122 described in connection with FIG. 1, can utilize the simulation of the task to determine controls which are utilized to attempt to perform the task in the real world. In an embodiment, the results of the real-world attempt are utilized in the system to determine updated and/or refined values for the simulation parameters. In an embodiment, the system can utilize variations of simulation parameters in various simulations to determine sets of simulation parameters and simulated results. In an embodiment, the system compares the results of the real-world attempt to the sets of simulation parameters and simulated results. In an embodiment, an operation such as a least mean square optimization algorithm, metric cost function, and/or variations thereof, is utilized to determine a set of simulation parameters that most closely matches the results of the real-world attempt. In an embodiment, the determined set of simulation parameters can be denoted as the current values. Furthermore, in an embodiment, the determined set of simulation parameters, or current values, can be utilized again to generate an updated simulation of the task. In an embodiment, the updated simulation of the task can re-determine controls for a subsequent attempt to perform the task in the real world. In an embodiment, the simulation parameters are continuously refined utilizing the results of previous real-world attempts to perform the task, until a desired result of the simulation and real world task is achieved.

Figure 5:
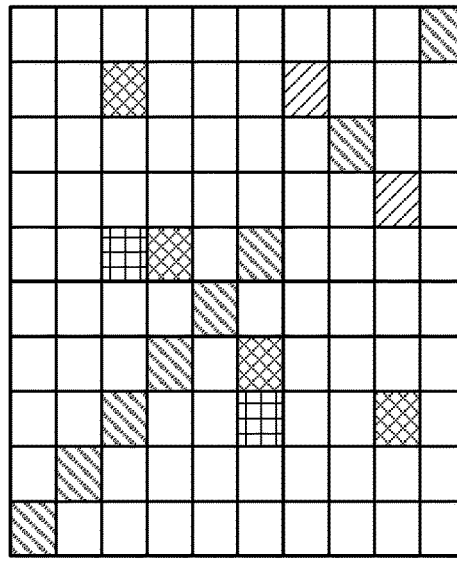
FIG. 5 illustrates an example of a covariance matrix that captures dependencies between parameters, in an embodiment.
Figure 5:
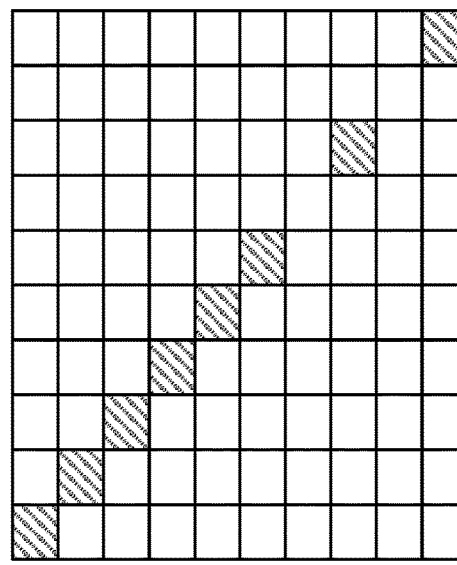

FIG. 5 illustrates an example of a covariance matrix that captures dependencies between parameters, in an embodiment. In the diagram 500 of FIG. 5, a covariance matrix is represented by a grid, and the shading of each cell in the grid represents a different value. In an embodiment, a first covariance matrix 502 is initialized with parameters and ranges for a particular task. In an embodiment, the first covariance matrix illustrates an initial value where the interactions between simulation parameters are limited. Over time, as the simulation is adjusted in response to attempts to perform the task, the covariance matrix changes to include relations between simulation parameters as shown in a second covariance matrix 504. In an embodiment, cross-covariant elements are represented by the presence of cells off the diagonal of the grid.

In some examples, as the system optimizes real world trajectories over time, each optimization iteration may decrease the covariance causing the covariance to collapse after a few iterations. In an embodiment, the system adds a minimum covariance to the optimized covariance so that it does not reach zero.

In an embodiment, when a human initializes the covariances of the parameters, avoid initializing the covariance to very large values in an attempt to cover a wider operating range as this may exacerbate the learning process. In an embodiment, covariance initialization tends to be more conservative and therefore preferred.

In some embodiments, friction, damping, compliance may not be easily determinable. In an embodiment, in the real world it may be possible that the system learns to transfer from simulation to real world without actually converging on parameters that are physically accurate. For example, some embodiments may converge on a solution that produces an accurate control system but does not have simulation parameters that correspond to real-world values. In another example, in an embodiment, the algorithm may learn the friction of a gripper which may be useful for opening the drawer but may not work if applied to a different task.

However, in some embodiments, situations may arise in various real world examples where learned parameters can be used to perform multiple tasks. For example, in an embodiment, a task involves discovering depth from monocular camera is never metric in scale but a stereo pair with known baseline can give depth in metric scales. In an embodiment, such gauge freedom can be resolved via external calibration, or ensuring that multiple tasks are tied together and learned with the shared parameter. In an embodiment, some external priors may be added so that learned parameters may be used across different tasks.

Figure 6:
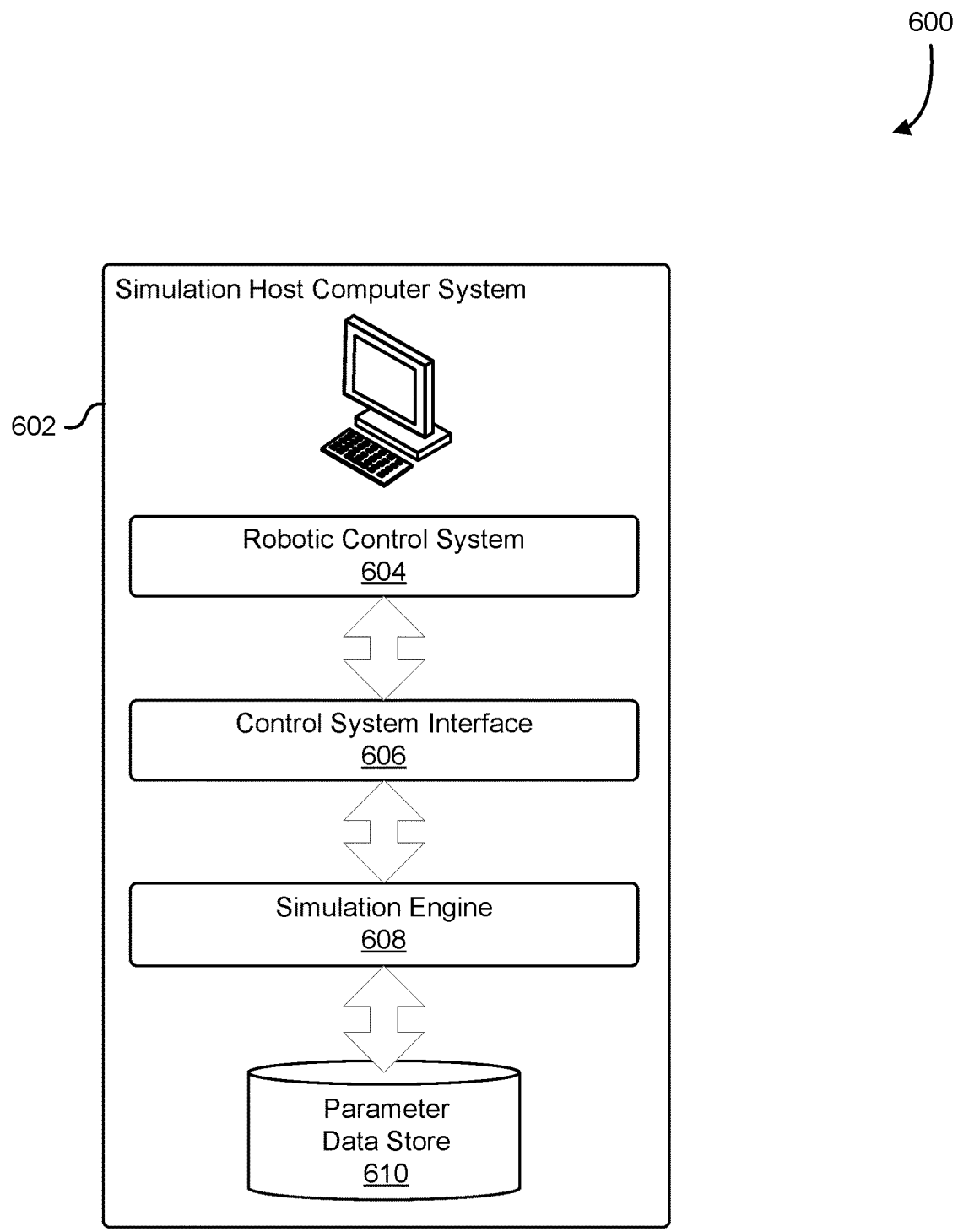
FIG. 6 illustrates an example of a computer system that hosts a simulation of the task, in an embodiment.

FIG. 6 illustrates an example of a computer system that hosts a simulation of the task, in an embodiment. In an embodiment, FIG. 6 depicts an example 600 of a simulation host computer system 602 comprising a robotic control system 604, a control system interface 606, a simulation engine 608, and a parameter data store 610. In an embodiment, the simulation host computer system 602 is a system like the control computer 122 as described in connection with FIG. 1. In an embodiment, the simulation host computer system 602 can be any suitable system, such as a computer system and/or graphics system. In an embodiment, a computer system can comprise one or more instances of a physical computing instance, such as a physical computer or device, or one or more instances of a virtual computing instance, such as a virtual machine, which can be hosted on one or more computer servers. Additionally, in an embodiment, a computer system can comprise various components and/or subsystems, such as one or more processors, memory storing instructions executable by the one or more processors, graphics subsystems, and/or variations thereof. In an embodiment, the system can be a parallel processing unit ("PPU") or a general processing cluster ("GPC").

In an embodiment, the robotic control system 604 is a control system that determines controls for a system. In an embodiment, the system can be a system such as the computer-controlled robot 110 described in connection with FIG. 1, and/or variations thereof. In an embodiment, the robotic control system 604 comprises a control system. In an embodiment, a control system is a system that regulates, manages, and controls a system, such a system connected through the control system interface 606, utilizing control loops, feedback, and various other mechanisms. In an embodiment, the robotic control system 604 can comprise various control schemes such as proportional-integral-derivative ("PID") control, feedback control, logic control, linear control, and/or variations thereof. Furthermore, in an embodiment, the robotic control system 604 can utilize various structures such as a neural network, structured prediction system, anomaly detection system, supervised learning system, artificial intelligence system, and/or variations thereof, to manage the various control schemes. In an embodiment, the robotic control system 604 determines controls for a system connected via the control system interface 606.

In an embodiment, the control system interface 606 comprises one or more interfaces that can facilitate communication between the simulation host computer system 602 comprising the robotic control system 604, and an external device, such as a robot, that can be operated and controlled. In an embodiment, the control system interface 606 can comprise any suitable communication channel by which two or more devices can communicate, including physical network cables, wireless communications, universal serial bus ("USB"), serial, parallel, and/or variations thereof. Additionally, in an embodiment, the control system interface 606 can be configured to communicate through, among others, the Internet, an intranet, wide area network ("WAN"), local area network ("LAN"), and direct connection and can utilize any type of communication protocol, including a cellular wireless communications protocol, a wireless local area network ("WLAN") communications protocol, short range communications protocol, and/or variations thereof. In an embodiment, the control system interface 606 can utilize one or more applications and/or protocols existing on the simulation host computer system 602 to communicate with the external device.

In an embodiment, the simulation engine 608 is a software engine that can generate and operate simulations. In an embodiment, the simulation engine 608 can comprise one or more applications and/or programs, which can be stored on the simulation host computer system 602 or retrieved from an external source that can generate and operate simulations. Additionally, in an embodiment, the simulation engine 608 can comprise various specialized hardware and/or software to generate and operate simulations. In an embodiment, the simulation engine 608 can utilize sets of parameters to govern various aspects of the generated simulations. In an embodiment, the parameters can determine various environmental, external, internal, input, and/or output aspects of the operation of the simulations. In an embodiment, for example, a simulation can utilize a wind resistance parameter, which can determine the wind resistance in the particular simulation.

In an embodiment, sets of parameters are stored in the parameter data store 610. In an embodiment, the parameter data store 610 is a collection of computing resources, physical and/or virtual, configured to operate, store, and/or access data. In an embodiment, the parameter data store 610 stores sets of parameters on behalf of the simulation engine 608. In an embodiment, the simulation engine 608 can comprise simulations of an external device connected to the simulation host computer system via the control system interface 606. In an embodiment, these simulations can be configured with or governed by sets of parameters stored in the parameter data store 610. In an embodiment, the simulation host computer system 602 can be utilized to perform the closed-loop process depicted in FIG. 7.

Figure 7:
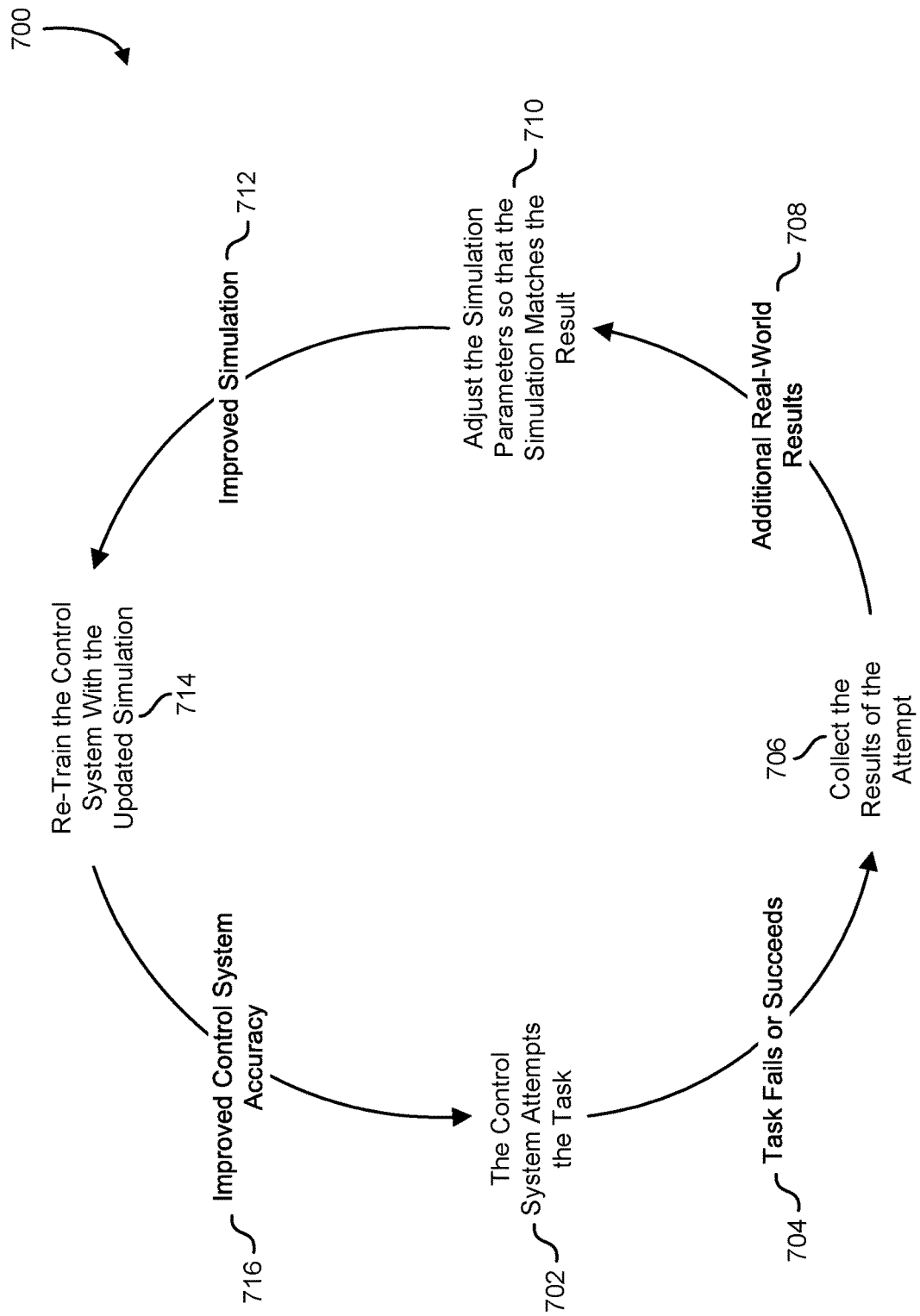
FIG. 7 illustrates an example of a closed-loop process for refining the parameters of a simulation that can be used to train a control system algorithm, in an embodiment.

FIG. 7 illustrates an example of a closed-loop process for refining the parameters of a simulation that can be used to train a control system algorithm, in an embodiment. In an embodiment, FIG. 7 depicts a closed-loop process 700 utilized by a system to refine the parameters of a simulation used to train a control system algorithm. In an embodiment, the system utilizing the closed-loop process 700 can be any suitable system, such as a computer system and/or graphics system. Additionally, in an embodiment, the system can comprise various other systems, such as a control system, and/or variations thereof. In an embodiment, the system utilizing the closed-loop process 700 is a system such as the simulation host computer system 602 described in connection with FIG. 6.

In an embodiment, the control system attempts the task 702. In an embodiment, the control system can be a control system like the robotic control system 604 described in connection with FIG. 6, and can be part of the system utilizing the closed-loop process 700. In embodiment, the control system is a system that regulates, manages, and controls a system utilizing control loops, feedback, and various other mechanisms. Furthermore, in an embodiment, the control system can utilize various structures such as a neural network, structured prediction system, anomaly detection system, supervised learning system, artificial intelligence system, and/or variations thereof, to manage the various control schemes and determine controls.

In an embodiment, the task can be any suitable task that requires controls to perform. In an embodiment, the control system determines controls to attempt the task, and utilizes the controls to attempt the task. In an embodiment, the control system can attempt the task through interfacing with an externally connected device, such as a robot. In an embodiment, for example, the task can be a mechanical task performed by a robot, such as the bag placing task described in connection with FIG. 1. In an embodiment, continuing with the example, the control system can determine controls that the robot can utilize to attempt to perform the bag placing task.

In an embodiment, the task fails or succeeds 704. In an embodiment, the failure or success of the task can be indicated by one or more outputs from the task attempt and/or other external devices. In an embodiment, the system utilizing the closed-loop process 700 determines failure or success by analyzing one or more results from the task attempt as well as other external devices that can monitor the performance of the task. In an embodiment, the system utilizing the closed-loop process 700 collects the results of the attempt 706. In an embodiment, results of the attempt can be collected through various interfaces, such as through reports from the control system, reports from external devices, and/or variations thereof. In an embodiment, the results of the attempt can comprise various data about the attempt, such as whether the attempt succeeded or failed, the nature of the success/failure, external effects on the attempt, and/or variations thereof. In an embodiment, continuing with the previous example, the attempt can comprise a robot attempting to perform the bag placing task. In an embodiment, the results from the attempt can comprise whether the bag went into the cup, how the bag moved when prompted by the robot, how the cup reacted to the bag motion, and/or variations thereof. In an embodiment, additional real-world results 708 can also be collected.

In an embodiment, the system utilizing the closed-loop process 700 adjusts the simulation parameters so that the simulation matches the result 710. In an embodiment, the system adjusts the simulation parameters by generating a plurality of simulation parameter sets. In an embodiment, the system runs the plurality of simulation parameter sets in various simulations, and compares the results from the various simulations to the real-world results. In an embodiment, the simulation parameters are adjusted utilizing various techniques such that the adjusted simulation parameters produce simulation results that exactly or approximately match the real-world results. In an embodiment, an improved simulation 712 can be produced from the adjusted simulation parameters. In an embodiment, the improved simulation reflects a more accurate simulation of the task as real-world results of the task have been incorporated into the improved simulation.

In an embodiment, the system utilizing the closed-loop process 700 re-trains the control system with the updated simulation 714. In an embodiment, for example, the control system can be re-trained by utilizing the updated simulation as an input into one or more machine learning and artificial intelligence applications the control system can comprise. In an embodiment, the control system can comprise various machine learning and artificial intelligence applications. In an embodiment, these various machine learning and artificial intelligence applications can utilize the updated simulation to model the task within the updated simulation. In an embodiment, the control system, utilizing the updated simulation, determines controls to perform the task in the real world. In an embodiment, re-training the control system with the updated simulation results in an improved control system accuracy 716. In an embodiment, the control system utilizes the improved control system accuracy to attempt the task 702 again with newly determined controls, restarting the closed-loop process 700.

Figure 8:
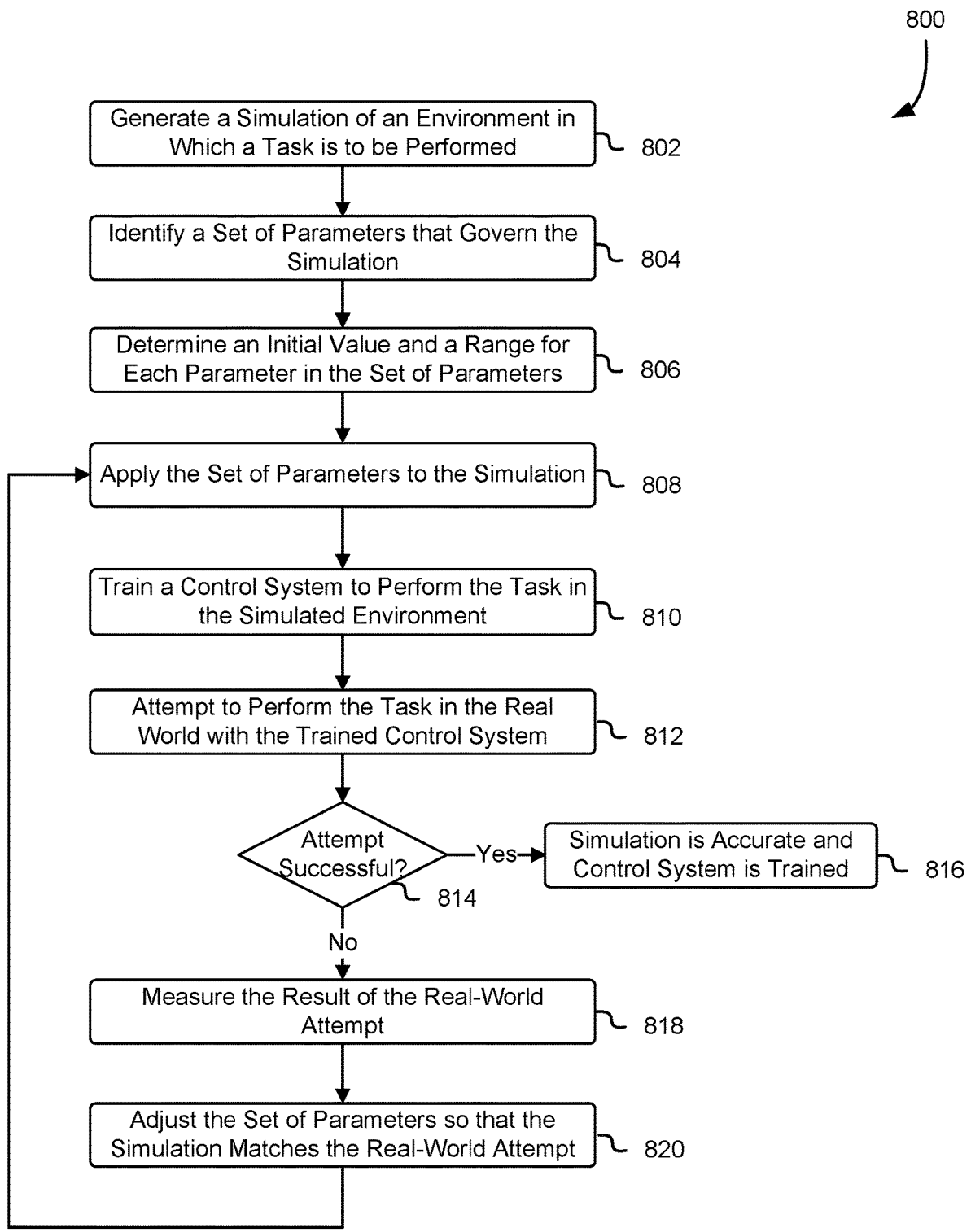
FIG. 8 illustrates an example of a process that, as a result of being performed by a computer system, trains a control system using a simulation that is updated using real-world attempts, in an embodiment.

FIG. 8 illustrates an example of a process that, as a result of being performed by a computer system, trains a control system using a simulation that is updated using real-world attempts, in an embodiment. In an embodiment, FIG. 8 depicts a process 800 to train and update a control system using a simulation. In an embodiment, the system performing the process 800 can be any suitable system, such as a computer system and/or graphics system. Additionally, in an embodiment, the system can comprise various other systems, such as a control system, and/or variations thereof. In an embodiment, the system performing the process 800 is a system such as the simulation host computer system 602 described in connection with FIG. 6.

In an embodiment, the system performing the process 800 generates 802 a simulation of an environment in which a task is to be performed. In an embodiment, the system can generate the simulation utilizing a simulation engine, such as the simulation engine 608 described in connection with FIG. 6. In an embodiment, the task can be any suitable task that requires controls to perform. In an embodiment, for example, the task can be a mechanical task that a robot must perform, such as the bag placing task described in connection with FIG. 1. In an embodiment, continuing with the example, the system can generate a simulation of an environment comprising a robot performing the bag placing task.

In an embodiment, the system performing the process 800 identifies 804 a set of parameters that govern the simulation. In an embodiment, the simulation can utilize various parameters to determine various aspects of the operation of the simulation. In an embodiment, the parameters can determine various environmental, external, internal, input, and/or output aspects of the operation of the simulation. In an embodiment, for example, a simulation can utilize a wind resistance parameter, which can determine the values of wind resistance in the particular simulation. Further information regarding the parameters of a simulation can be found in the descriptions of FIG. 2 and FIG. 6.

In an embodiment, the system performing the process 800 determines 806 an initial value and a range for each parameters in the set of parameters. In an embodiment, the range for each parameter can be determined based on various factors. In an embodiment, the range for each parameter can be determined based on results of previous simulations, historical data relating to the parameters, and/or variations thereof. In an embodiment, an initial value is determined for each parameter. In an embodiment, the initial value can be determined based on various factors, such as desired results, results of previous simulations, historical data relating to the parameters, and/or variations thereof. In an embodiment, the system performing the process 800 applies 808 the set of parameters to the simulation. In an embodiment, the system can apply the set of parameters to the simulation by instantiating a new simulation governed by the set of parameters, modifying the parameters of an existing generated simulation with the set of parameters, and/or variations thereof.

In an embodiment, the system performing the process 800 trains 810 a control system to perform the task in the simulated environment. In an embodiment, the system can comprise various machine learning and artificial intelligence applications. In an embodiment, the system can utilize the simulated environment as an input to the various machine learning and artificial intelligence applications. The system can train the various machine learning and artificial intelligence applications to perform the task within the input simulated environment. In an embodiment, training the control system to perform the task in the simulated environment results in the determination of controls to perform the task in the real world.

In an embodiment, the system performing the process 800 attempts 812 to perform the task in the real world with the trained control system. In an embodiment, the system utilizes the controls determined via the training of the control system to attempt to perform the task. In an embodiment, for example, the task can comprise a robot placing a bag in a cup. In an embodiment, the controls can comprise mechanical controls that direct the robot to place the bag in the cup.

In an embodiment, if the attempt 814 is successful, the simulation 816 is accurate and control system is trained. In an embodiment, an accurate simulation can refer to a simulation in which the simulation accurately re-creates and generates a representation of an environment, such as the environment comprising the performance of the task. In an embodiment, the accurate simulation is utilized to train the control system. In an embodiment, the trained control system can accurately produce controls to perform the task in the real world.

In an embodiment, if the attempt 814 is not successful, the system performing the process 800 measures 818 the result of the real-world attempt. In an embodiment, the result can comprise one or more measurements of various factors of the real-world attempt, such as environmental factors, external factors, internal factors, and/or variations thereof. In an embodiment, for example, the task can comprise a robot placing a bag into a cup. In an embodiment, continuing with the example, the results from of the real-world attempt of the task can comprise whether the bag went into the cup, how the bag moved when prompted by the robot, how the cup reacted to the bag motion, and/or variations thereof.

In an embodiment, the system performing the process 800 adjusts 820 the set of parameters so that the simulation matches the real-world attempt. In an embodiment, the system can adjust the set of parameters through the usage of various functions, such as a least mean square algorithm, metric cost function, and/or variations thereof. In an embodiment, the system adjusts the set of parameters by generating a plurality of simulation parameter sets. In an embodiment, the system runs the plurality of simulation parameter sets in various simulations, and compares the results from the various simulations to the real-world attempt results. In an embodiment, the set of parameters are adjusted such that the adjusted set of parameters produce simulation results that approximately or exactly match the real-world attempt results. It should be noted that, in an embodiment, the set of parameters can be adjusted in various ways, such as through the utilization of various processes and other optimization, interpolation, and/or variations thereof functions. In an embodiment, the system performing the process 800 applies 808 the set of parameters, which have been adjusted, to the simulation. In an embodiment, the system repeats the processes of 808-820 until the attempt to perform the task in the real world is successful, and the simulation is accurate and the control system is trained.

Figure 9:
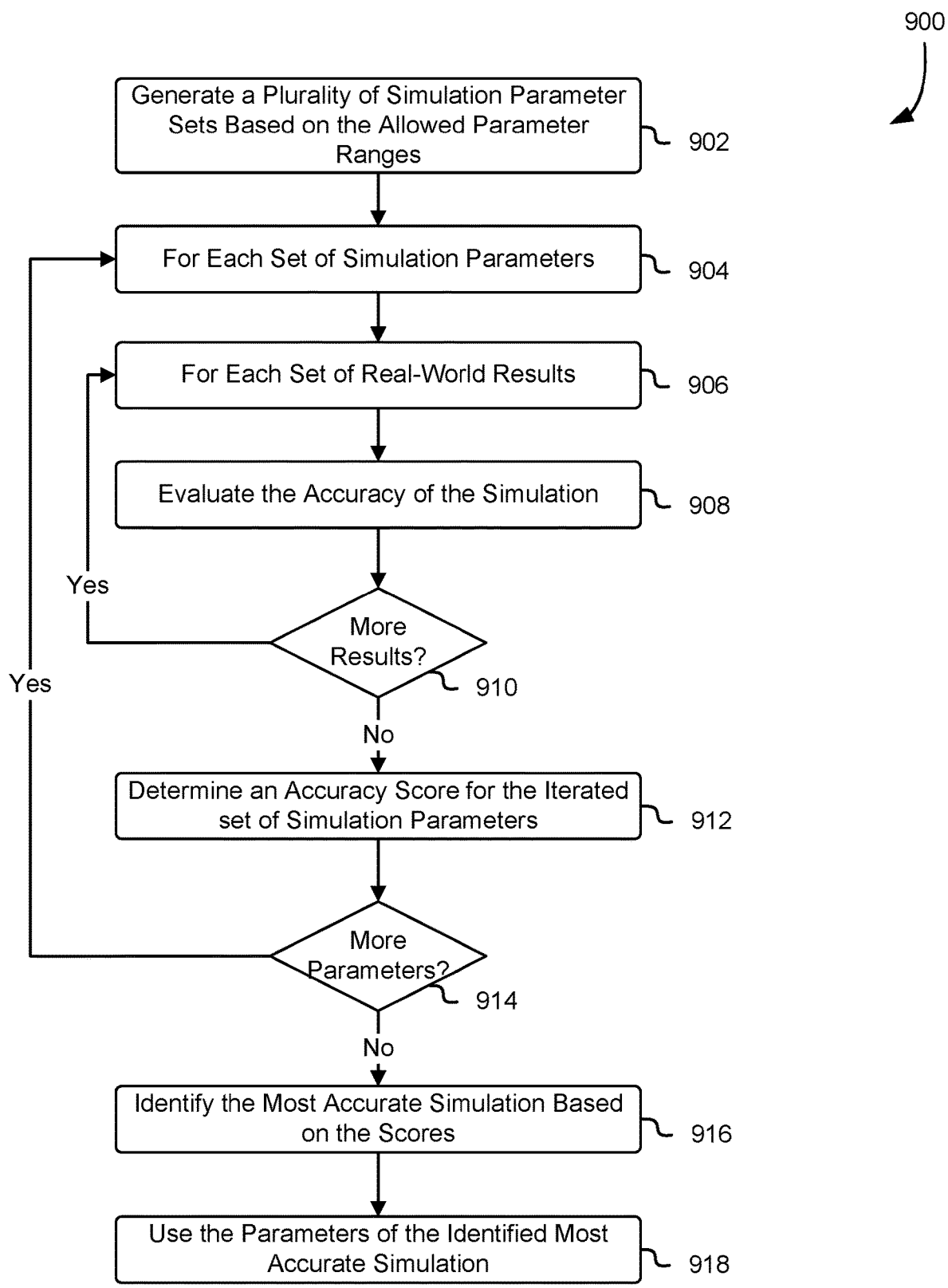
FIG. 9 illustrates an example of a process that, as a result of being performed by a computer system, adjusts the parameters of a simulation in response to an attempt to perform a task in the real world, in an embodiment.

FIG. 9 illustrates an example of a process that, as a result of being performed by a computer system, adjusts the parameters of a simulation in response to an attempt to perform a task in the real world, in an embodiment. In an embodiment, FIG. 9 depicts a process 900 for adjusting the parameters of a simulation of a task, such as a simulation of the bag placing task described in connection with FIG. 1. In an embodiment, the system performing the process 900 can be any suitable system, such as a computer system and/or graphics system. Additionally, in an embodiment, the system can comprise various other systems, such as a control system, and/or variations thereof. In an embodiment, the system performing the process 900 is a system such as the simulation host computer system 602 described in connection with FIG. 6.

In an embodiment, the system performing the process 900 generates 902 a plurality of simulation parameter sets based on the allowed parameter ranges. In an embodiment, a simulation can utilize various parameters to determine various aspects, such as the environmental, external, internal, input, and/or output aspects, of the operation of the simulation. Further information regarding the parameters of a simulation can be found in the descriptions of FIG. 2 and FIG. 6. In an embodiment, for each parameter, the system can determine an allowable parameter range. In an embodiment, the system can generate a plurality of simulation parameter sets based on values falling within the allowed parameter ranges.

In an embodiment, the system performing the process 900, for 904 each set of simulation parameters, for 906 each set of real-world results, evaluates 908 the accuracy of the simulation. In an embodiment, the system can obtain sets of real-world results from a real-world performance of the task simulated in the simulations. In an embodiment, the system compares the real-world results to results of the simulation. In an embodiment, the accuracy of the simulation is evaluated based on the similarity between the simulation and real-world results. In an embodiment, the simulation is run utilizing the set of simulation parameters. In an embodiment, the results from running the simulation are compared to the real-world results. In an embodiment, if more 910 results remain, the system can evaluate each set of real-world results against the simulation results.

In an embodiment, the system performing the process 900 determines 912 an accuracy score for the iterated set of simulation parameters. In an embodiment, the accuracy score can be determined based on various factors of the simulation governed by the set of simulation parameters with respect to the sets of real-world results. In an embodiment, these factors can include degrees of similarity between the simulation and the real-world results, degrees of differences between the simulation and the real-world results, and/or variations thereof. In an embodiment, the accuracy score corresponds to the degree of accuracy between the simulation and the real-world results. In an embodiment, a higher accuracy score can reflect a higher degree of accuracy, although other scoring schemes can be utilized. In an embodiment, the system performing the process 900 determines if more 914 parameters remain. In an embodiment, if more parameters remain, the system repeats the processes in 904-914 for each set of simulation parameters that the generated plurality of simulation parameter sets comprises.

In an embodiment, if no parameters remain, the system performing the process 900 identifies 916 the most accurate simulation based on the scores. In an embodiment, the system can utilize an error signal generated from the scores in a least mean square optimization algorithm, although other optimization algorithms can be used, to determine the score that corresponds to a minimal error and maximum accuracy. In an embodiment, the determined score corresponds to a set of parameters that corresponds to the most accurate simulation. In an embodiment, the system performing the process 900 uses 918 the parameters of the identified most accurate simulation. In an embodiment, the system can utilize the parameters to generate an accurate simulation that can be utilized to train a control system to determine controls to perform the task in the real world.

In an embodiment, a computer system trains a machine learning system to perform a task using a simulation of a real-world environment, wherein the simulation governed by a set of parameters. In an embodiment, after training with the simulation until the system performs the task successfully in the simulation, the system attempts to perform the task in the real-world environment with the trained machine learning system. In an embodiment, the system adjusts the set of parameters of the simulation so that the result of the simulation matches a result of the attempt in the real world. In an embodiment, the system retrains the machine learning system using the simulation with the adjusted set of parameters, and then makes another attempt in the real world.

In an embodiment, a computer system trains a machine learning model to be used by a robotic device to perform a task using a simulation of a real-world environment. In an embodiment, the system causes a robotic device to attempt the task in the real-world environment with the trained machine learning model, and then adjusts a set of parameters of the simulation so that a result of the simulation matches a result of the attempt. In an embodiment, the system retrains the machine learning model using the simulation with the adjusted set of parameters.

Figure 10:
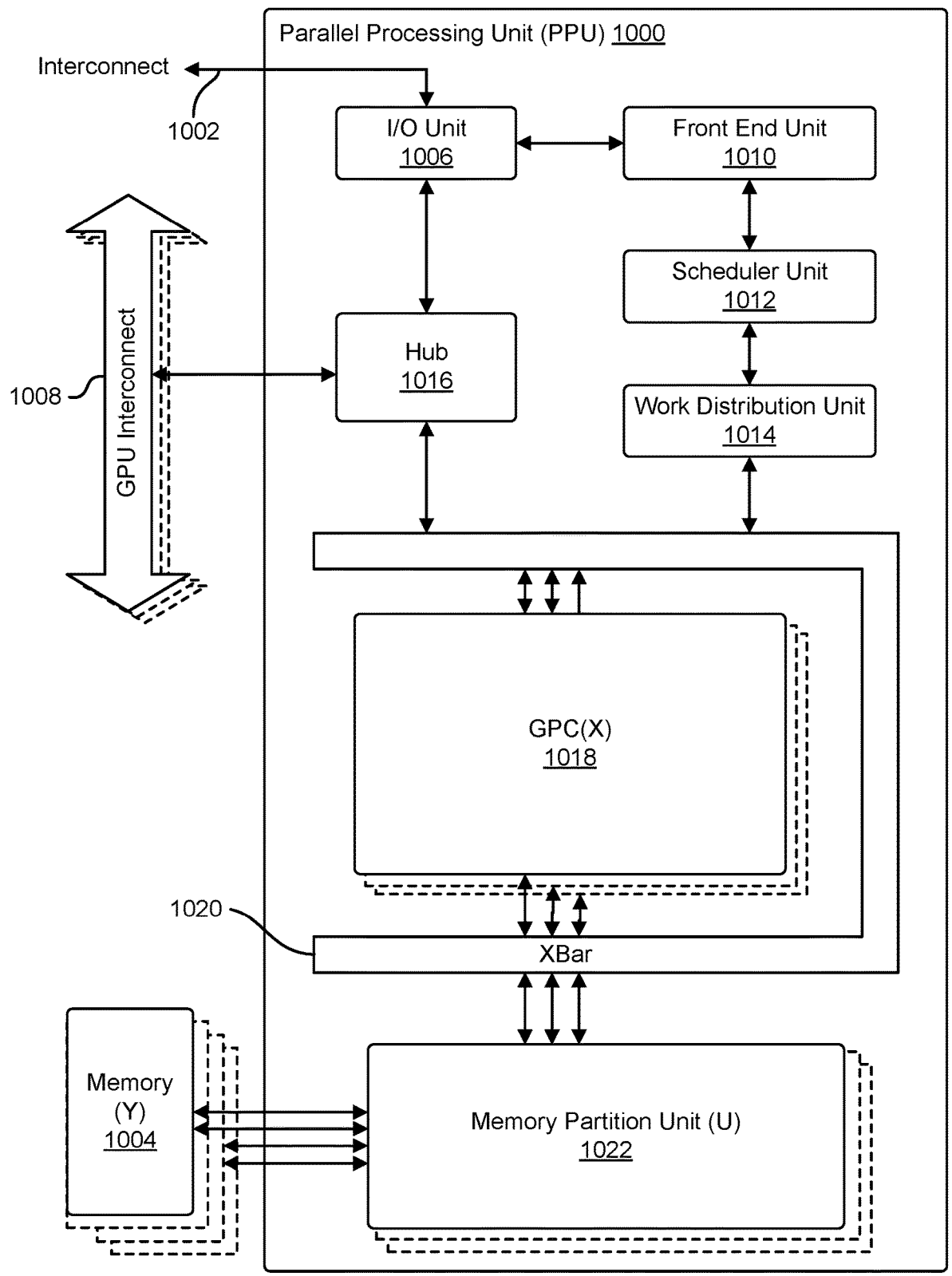
FIG. 10 illustrates an example of parallel processing unit ("PPU"), in accordance with an embodiment.

FIG. 10 illustrates a parallel processing unit ("PPU") 1000, in accordance with one embodiment. In an embodiment, the PPU 1000 is configured with machine-readable code that, if executed by the PPU, causes the PPU to perform some or all of processes and techniques described throughout this disclosure. In an embodiment, the PPU 1000 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 1000. In an embodiment, the PPU 1000 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 1000 is utilized to perform computations such as linear algebra operations and machine-learning operations. FIG. 10 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 1000 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 1000 includes an Input/Output ("I/O") unit 1005, a front-end unit 1010, a scheduler unit 1012, a work distribution unit 1014, a hub 1016, a crossbar ("Xbar") 1020, one or more general processing clusters ("GPCs") 1018, and one or more partition units 1022. In an embodiment, the PPU 1000 is connected to a host processor or other PPUs 1000 via one or more high-speed GPU interconnects 1008. In an embodiment, the PPU 1000 is connected to a host processor or other peripheral devices via an interconnect 1002. In an embodiment, the PPU 1000 is connected to a local memory comprising one or more memory devices 1004. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 1008 may refer to a wire-based multi-lane communications link that is used by systems to scale and include one or more PPUs 1000 combined with one or more CPUs, supports cache coherence between the PPUs 1000 and CPUs, and CPU mastering. In an embodiment, data and/or commands are transmitted by the high-speed GPU interconnect 1008 through the hub 1016 to/from other units of the PPU 1000 such as one or more copy engines, video encoders, video decoders, power management units, and other components which may not be explicitly illustrated in FIG. 10.

In an embodiment, the I/O unit 1006 is configured to transmit and receive communications (e.g., commands, data) from a host processor (not illustrated in FIG. 10) over the system bus 1002. In an embodiment, the I/O unit 1006 communicates with the host processor directly via the system bus 1002 or through one or more intermediate devices such as a memory bridge. In an embodiment, the I/O unit 1006 may communicate with one or more other processors, such as one or more of the PPUs 1000 via the system bus 1002. In an embodiment, the I/O unit 1006 implements a Peripheral Component Interconnect Express ("PCIe") interface for communications over a PCIe bus. In an embodiment, the I/O unit 1005 implements interfaces for communicating with external devices.

In an embodiment, the I/O unit 1006 decodes packets received via the system bus 1002. In an embodiment, at least some packets represent commands configured to cause the PPU 1000 to perform various operations. In an embodiment, the I/O unit 1006 transmits the decoded commands to various other units of the PPU 1000 as specified by the commands. In an embodiment, commands are transmitted to the front-end unit 1010 and/or transmitted to the hub 1016 or other units of the PPU 1000 such as one or more copy engines, a video encoder, a video decoder, a power management unit, etc. (not explicitly illustrated in FIG. 10). In an embodiment, the I/O unit 1006 is configured to route communications between and among the various logical units of the PPU 1000.

In an embodiment, a program executed by the host processor encodes a command stream in a buffer that provides workloads to the PPU 1000 for processing. In an embodiment, a workload comprises instructions and data to be processed by those instructions. In an embodiment, the buffer is a region in a memory that is accessible (e.g., read/write) by both the host processor and the PPU 1000—the host interface unit may be configured to access the buffer in a system memory connected to the system bus 1002 via memory requests transmitted over the system bus 1002 by the 110 unit 1006. In an embodiment, the host processor writes the command stream to the buffer and then transmits a pointer to the start of the command stream to the PPU 1000 such that the front-end unit 1010 receives pointers to one or more command streams and manages the one or more streams, reading commands from the streams and forwarding commands to the various units of the PPU 1000.

In an embodiment, the front-end unit 1010 is coupled to a scheduler unit 1012 that configures the various GPCs 1018 to process tasks defined by the one or more streams. In an embodiment, the scheduler unit 1012 is configured to track state information related to the various tasks managed by the scheduler unit 1012 where the state information may indicate which GPC 1018 a task is assigned to, whether the task is active or inactive, a priority level associated with the task, and so forth. In an embodiment, the scheduler unit 1012 manages the execution of a plurality of tasks on the one or more GPCs 1018.

In an embodiment, the scheduler unit 1012 is coupled to a work distribution unit 1014 that is configured to dispatch tasks for execution on the GPCs 1018. In an embodiment, the work distribution unit 1014 tracks a number of scheduled tasks received from the scheduler unit 1012 and the work distribution unit 1014 manages a pending task pool and an active task pool for each of the GPCs 1018. In an embodiment, the pending task pool comprises a number of slots (e.g., 32 slots) that contain tasks assigned to be processed by a particular GPC 1018; the active task pool may comprise a number of slots (e.g., 4 slots) for tasks that are actively being processed by the GPCs 1018 such that as a GPC 1018 completes the execution of a task, that task is evicted from the active task pool for the GPC 1018 and one of the other tasks from the pending task pool is selected and scheduled for execution on the GPC 1018. In an embodiment, if an active task is idle on the GPC 1018, such as while waiting for a data dependency to be resolved, then the active task is evicted from the GPC 1018 and returned to the pending task pool while another task in the pending task pool is selected and scheduled for execution on the GPC 1018.

In an embodiment, the work distribution unit 1014 communicates with the one or more GPCs 1018 via XBar 1020. In an embodiment, the XBar 1020 is an interconnect network that couples many of the units of the PPU 1000 to other units of the PPU 1000 and can be configured to couple the work distribution unit 1014 to a particular GPC 1018. Although not shown explicitly, one or more other units of the PPU 1000 may also be connected to the XBar 1020 via the hub 1016.

The tasks are managed by the scheduler unit 1012 and dispatched to a GPC 1018 by the work distribution unit 1014. The GPC 1018 is configured to process the task and generate results. The results may be consumed by other tasks within the GPC 1018, routed to a different GPC 1018 via the XBar 1020, or stored in the memory 1004. The results can be written to the memory 1004 via the partition units 1022, which implement a memory interface for reading and writing data to/from the memory 1004. The results can be transmitted to another PPU 1004 or CPU via the high-speed GPU interconnect 1008. In an embodiment, the PPU 1000 includes a number U of partition units 1022 that is equal to the number of separate and distinct memory devices 1004 coupled to the PPU 1000. A partition unit 1022 will be described in more detail below in conjunction with FIG. 10.

In an embodiment, a host processor executes a driver kernel that implements an application programming interface ("API") that enables one or more applications executing on the host processor to schedule operations for execution on the PPU 1000. In an embodiment, multiple compute applications are simultaneously executed by the PPU 1000 and the PPU 1000 provides isolation, quality of service ("QoS"), and independent address spaces for the multiple compute applications. In an embodiment, an application generates instructions (e.g., in the form of API calls) that cause the driver kernel to generate one or more tasks for execution by the PPU 1000 and the driver kernel outputs tasks to one or more streams being processed by the PPU 1000. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, elsewhere in the present document.

Figure 11:
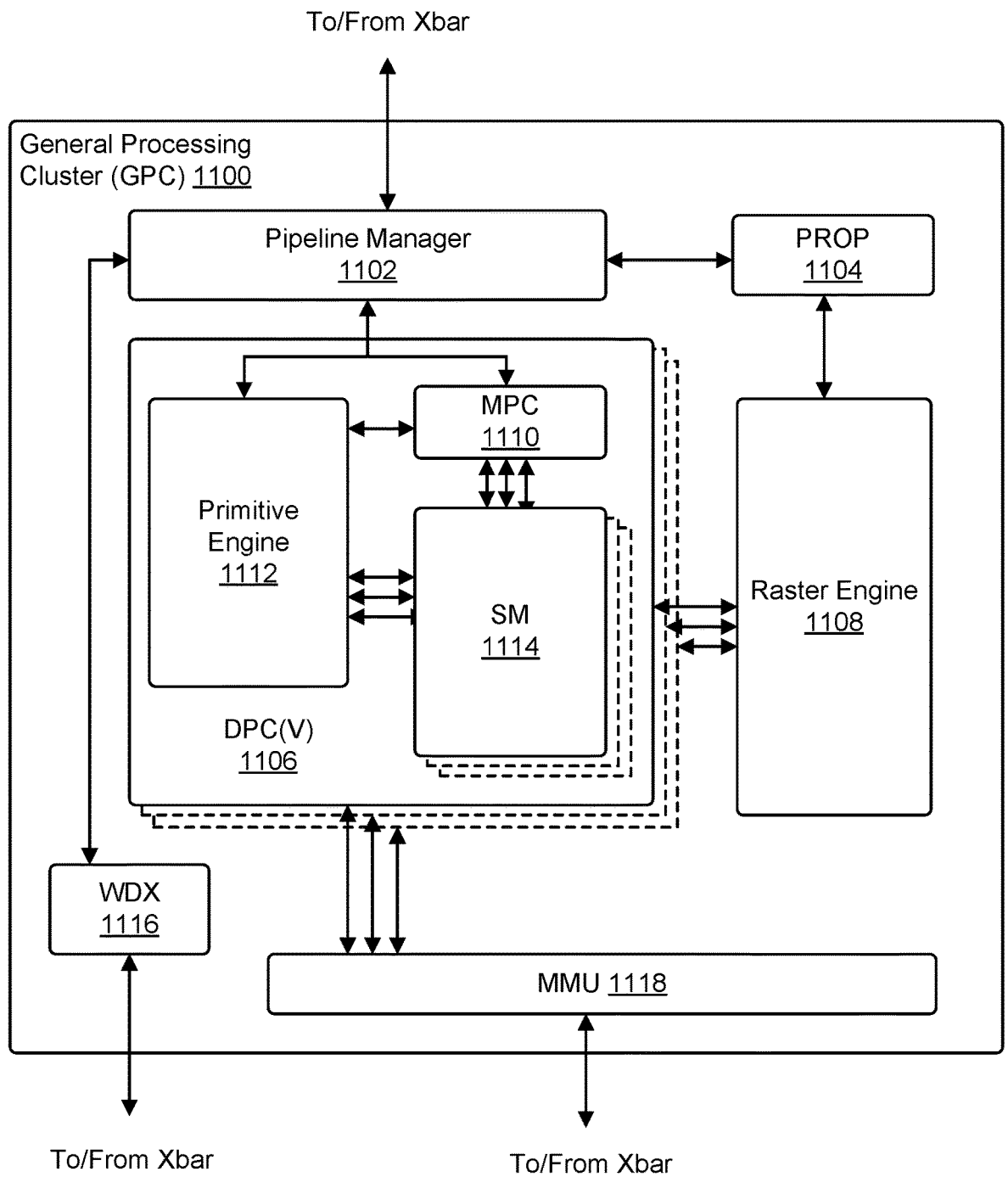
FIG. 11 illustrates an example of a general processing cluster ("GPC"), in accordance with one embodiment.

FIG. 11 illustrates a GPC 1100 such as the GPC illustrated of the PPU 1000 of FIG. 10, in accordance with one embodiment. In an embodiment, each GPC 1100 includes a number of hardware units for processing tasks and each GPC 1100 includes a pipeline manager 1102, a pre-raster operations unit ("PROP") 1104, a raster engine 1108, a work distribution crossbar ("WDX") 1116, a memory management unit ("MMU") 1118, one or more Data Processing Clusters ("DPCs") 1106, and any suitable combination of parts. It will be appreciated that the GPC 1100 of FIG. 11 may include other hardware units in lieu of or in addition to the units shown in FIG. 11.

In an embodiment, the operation of the GPC 1100 is controlled by the pipeline manager 1102. The pipeline manager 1102 manages the configuration of the one or more DPCs 1106 for processing tasks allocated to the GPC 1100. In an embodiment, the pipeline manager 1102 configures at least one of the one or more DPCs 1106 to implement at least a portion of a graphics rendering pipeline. In an embodiment, a DPC 1106 is configured to execute a vertex shader program on the programmable streaming multiprocessor ("SM") 1114. The pipeline manager 1102 is configured to route packets received from a work distribution to the appropriate logical units within the GPC 1100, in an embodiment, and some packets may be routed to fixed function hardware units in the PROP 1104 and/or raster engine 1108 while other packets may be routed to the DPCs 1106 for processing by the primitive engine 1112 or the SM 1114. In an embodiment, the pipeline manager 1102 configures at least one of the one or more DPCs 1106 to implement a neural network model and/or a computing pipeline.

The PROP unit 1104 is configured, in an embodiment, to route data generated by the raster engine 1108 and the DPCs 1106 to a Raster Operations ("ROP") unit in the memory partition unit, described in more detail above. In an embodiment, the PROP unit 1104 is configured to perform optimizations for color blending, organize pixel data, perform address translations, and more. The raster engine 1108 includes a number of fixed function hardware units configured to perform various raster operations, in an embodiment, and the raster engine 1108 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 1108 comprises fragments to be processed by any suitable entity such as by a fragment shader implemented within a DPC 1106.

In an embodiment, each DPC 1106 included in the GPC 1100 comprises an M-Pipe Controller ("MPC") 1110; a primitive engine 1112; one or more SMs 1114; and any suitable combination thereof. In an embodiment, the MPC 1110 controls the operation of the DPC 1106, routing packets received from the pipeline manager 1102 to the appropriate units in the DPC 1106. In an embodiment, packets associated with a vertex are routed to the primitive engine 1112, which is configured to fetch vertex attributes associated with the vertex from memory; in contrast, packets associated with a shader program may be transmitted to the SM 1114.

In an embodiment, the SM 1114 comprises a programmable streaming processor that is configured to process tasks represented by a number of threads. In an embodiment, the SM 1114 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 1114 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 1114 is described in more detail below.

In an embodiment, the MMU 1118 provides an interface between the GPC 1100 and the memory partition unit and the MMU 1118 provides translation of virtual addresses into physical addresses, memory protection, and arbitration of memory requests. In an embodiment, the MMU 1118 provides one or more translation lookaside buffers ("TLBs") for performing translation of virtual addresses into physical addresses in memory.

Figure 12:
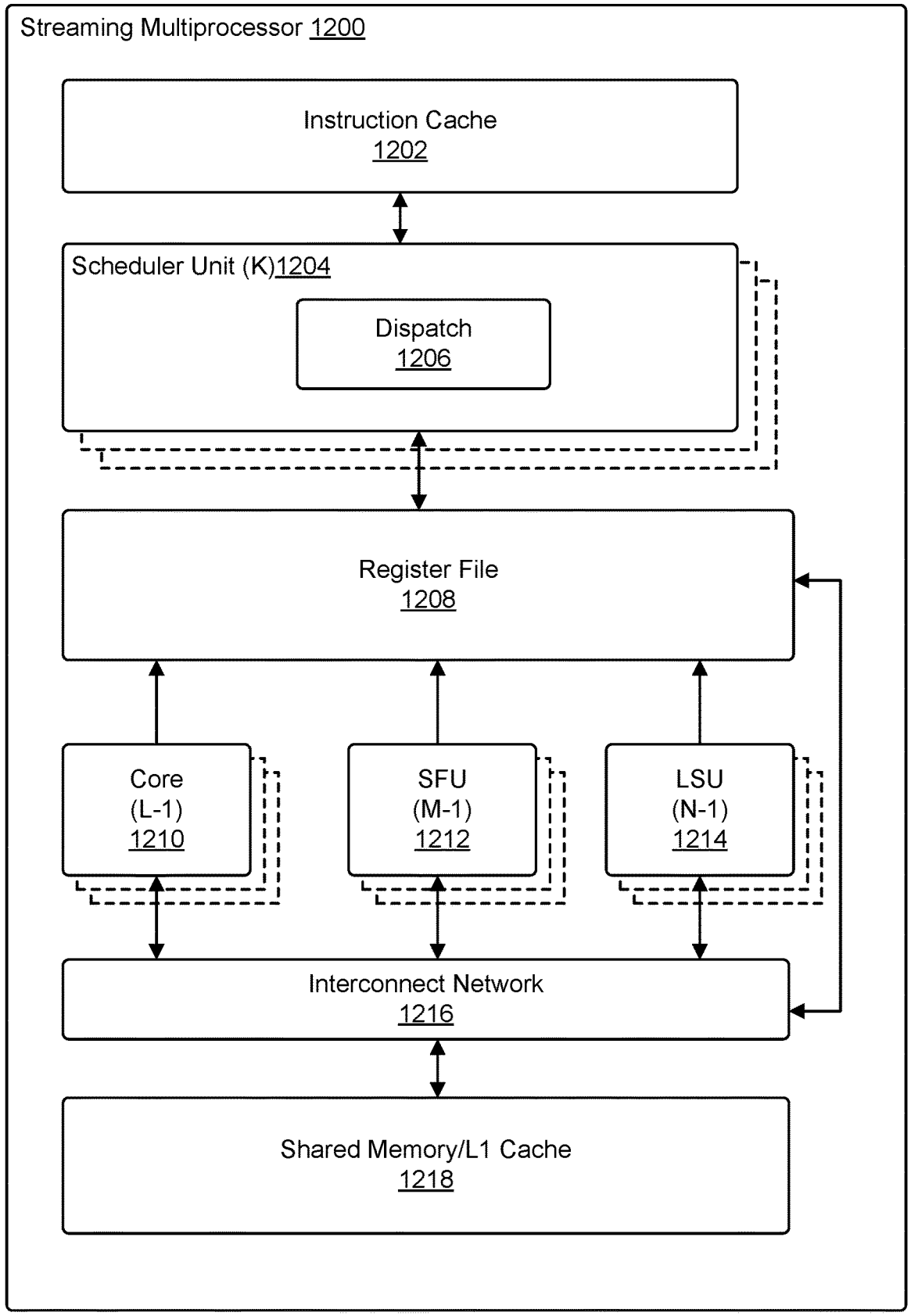
FIG. 12 illustrates an example of a streaming multi-processor, in accordance with one embodiment.

FIG. 12 illustrates a streaming multi-processor such as the streaming multi-processor of FIG. 11, in accordance with one embodiment. In an embodiment, the SM 1200 includes: an instruction cache 1202; one or more scheduler units 1204; a register file 1208; one or more processing cores 1210; one or more special function units ("SFUs") 1212; one or more load/store units ("LSUs") 1214; an interconnect network 1216; a shared memory/L1 cache 1218; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 1200. In an embodiment, the scheduler unit 1204 receives the tasks from the work distribution unit and manages instruction scheduling for one or more thread blocks assigned to the SM 1200. In an embodiment, the scheduler unit 1204 schedules thread blocks for execution as warps of parallel threads, wherein each thread block is allocated at least one warp. In an embodiment, each warp executes threads. In an embodiment, the scheduler unit 1204 manages a plurality of different thread blocks, allocating the warps to the different thread blocks and then dispatching instructions from the plurality of different cooperative groups to the various functional units (e.g., cores 1210, SRN 1212, and LSUs 1214) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1206 is configured to transmit instructions to one or more of the functional units and the scheduler unit 1204 includes two dispatch units 1206 that enable two different instructions from the same warp to be dispatched during each clock cycle. In an embodiment, each scheduler unit 1204 includes a single dispatch unit 1206 or additional dispatch units 1206.

Each SM 1200, in an embodiment, includes a register file 1208 that provides a set of registers for the functional units of the SM 1200. In an embodiment, the register file 1208 is divided between each of the functional units such that each functional unit is allocated a dedicated portion of the register file 1208. In an embodiment, the register file 1208 is divided between the different warps being executed by the SM 1200 and the register file 1208 provides temporary storage for operands connected to the data paths of the functional units. In an embodiment, each SM 1200 comprises a plurality of L processing cores 1210. In an embodiment, the SM 1200 includes a large number (e.g., 128 or more) of distinct processing cores 1210. Each core 1210, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1210 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 1210. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1200 comprises M SFUs 1212 that perform special functions (e.g., attribute evaluation, reciprocal square root, and the like). In an embodiment, the SFUs 1212 include a tree traversal unit configured to traverse a hierarchical tree data structure. In an embodiment, the SFUs 1212 include texture unit configured to perform texture map filtering operations. In an embodiment, the texture units are configured to load texture maps (e.g., a 2D array of texels) from the memory and sample the texture maps to produce sampled texture values for use in shader programs executed by the SM 1200. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1200 includes two texture units.

Each SM 1200 comprises N LSUs that implement load and store operations between the shared memory/L1 cache 1206 and the register file 1208, in an embodiment. Each SM 1200 includes an interconnect network 1216 that connects each of the functional units to the register file 1208 and the LSU 1214 to the register file 1208, shared memory/L1 cache 1218 in an embodiment. In an embodiment, the interconnect network 1216 is a crossbar that can be configured to connect any of the functional units to any of the registers in the register file 1208 and connect the LSUs 1214 to the register file and memory locations in shared memory/L1 cache 1218.

The shared memory/L1 cache 1218 is an array of on-chip memory that allows for data storage and communication between the SM 1200 and the primitive engine and between threads in the SM 1200 in an embodiment. In an embodiment, the shared memory/L1 cache 1218 comprises 128 KB of storage capacity and is in the path from the SM 1200 to the partition unit. The shared memory/L1 cache 1218, in an embodiment, is used to cache reads and writes. One or more of the shared memory/L1 cache 1218, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1218 enables the shared memory/L1 cache 1218 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1200 to execute the program and perform calculations, shared memory/L1 cache 1218 to communicate between threads, and the LSU 1214 to read and write global memory through the shared memory/L1 cache 1218 and the memory partition unit, in accordance with one embodiment. In an embodiment, when configured for general purpose parallel computation, the SM 1200 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 13:
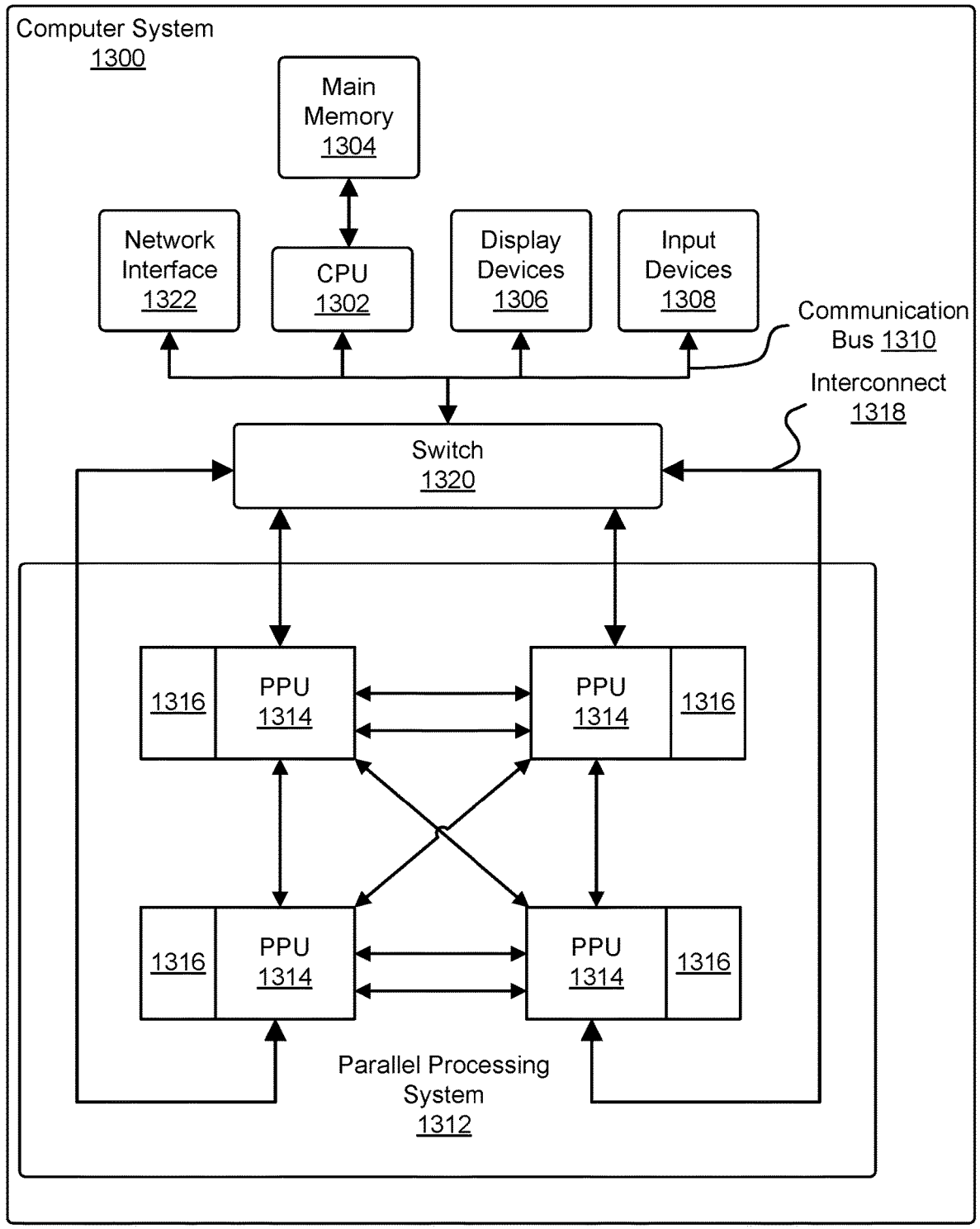
FIG. 13 illustrates a computer system in which the various examples can be implemented, in accordance with one embodiment.

FIG. 13 illustrates a computer system 1300 in which the various architecture and/or functionality can be implemented, in accordance with one embodiment. The computer system 1300, in an embodiment, is configured to implement various processes and methods described throughout this disclosure.

In an embodiment, the computer system 1300 comprises at least one central processing unit 1302 that is connected to a communication bus 1310 implemented using any suitable protocol, such as PCI (Peripheral Component Interconnect), PCI-Express, AGP (Accelerated Graphics Port), Hyper-Transport, or any other bus or point-to-point communication protocol(s).

In an embodiment, the computer system 1300 includes a main memory 1304 and control logic (e.g., implemented as hardware, software, or a combination thereof) and data are stored in the main memory 1304 which may take the form of random access memory ("RAM"). In an embodiment, a network interface subsystem 1322 provides an interface to other computing devices and networks for receiving data from and transmitting data to other systems from the computer system 1300.

The computer system 1300, in an embodiment, includes input devices 1308, the parallel processing system 1312, and display devices 1306 which can be implemented using a conventional CRT (cathode ray tube), LCD (liquid crystal display), LED (light emitting diode), plasma display, or other suitable display technologies. In an embodiment, user input is received from input devices 1308 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1304 and/or secondary storage. Computer programs, if executed by one or more processors, enable the system 1300 to perform various functions in accordance with one embodiment. The memory 1304, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1302; parallel processing system 1312; an integrated circuit capable of at least a portion of the capabilities of both the central processor 1302; the parallel processing system 1312; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1300 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1312 includes a plurality of PPUs 1314 and associated memories 1316. In an embodiment, the PPUs are connected to a host processor or other peripheral devices via an interconnect 1318 and a switch 1320 or multiplexer. In an embodiment, the parallel processing system 1312 distributes computational tasks across the PPUs 1314 which can be parallelizable for example, as part of the distribution of computational tasks across multiple GPU thread blocks. In an embodiment, memory is shared and accessible (e.g., for read and/or write access) across some or all of the PPUs 1314, although such shared memory may incur performance penalties relative to the use of local memory and registers resident to a PPU. In an embodiment, the operation of the PPUs 1314 is synchronized through the use of a command such as_syncthreads( ) which requires all threads in a block (e.g., executed across multiple PPUs 1314) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
performing one or more simulations at least by iteratively adjusting a range of one or more simulation parameters representing one or more physical characteristics of one or more autonomously controlled actions of an autonomous device based, at least in part, on a measured range of the one or more physical characteristics.

2. The computer-implemented method of claim 1, further comprising:
adjusting a simulation produced from the one or more simulation parameters to ensure that the simulation matches the one or more autonomously controlled actions; and
training a machine learning model based, at least in part, on the adjusted simulation.

3. The computer-implemented method of claim 1, wherein the iterative adjustment is based, at least in part, on differences between an attempt to perform the one or more autonomously controlled actions and a simulation of the one or more autonomously controlled actions.

4. The computer-implemented method of claim 1, wherein the iterative adjustment is based, at least in part, on differences between a simulation of the one or more autonomously controlled actions and successful performance of the one or more autonomously controlled actions.

5. A system, comprising:
a simulator to perform one or more simulations at least by iteratively adjusting a range of one or more simulation parameters representing one or more physical characteristics of one or more autonomously controlled actions of an autonomous device based, at least in part, on a measured range of the one or more physical characteristics.

6. The system of claim 5, wherein:
the range of one or more simulation parameters is iteratively adjusted in response to an attempt to perform the one or more autonomously controlled actions such that a result of performance of the one or more autonomously controlled actions in a simulation produced from the iteratively adjusted range of the one or more simulation parameters matches a result of the attempt to perform the one or more autonomously controlled actions.

7. The system of claim 6, wherein the attempt is a failed attempt to perform the one or more autonomously controlled actions.

8. The system of claim 6, wherein each simulation parameter in the one or more simulation parameters is specified by a range of allowable values.

9. The system of claim 6, wherein a simulation parameter in the one or more simulation parameters is adjusted by at least:
changing the simulation parameter;
performing the one or more autonomously controlled actions in the simulation; and
determining that the result of the performance of the one or more autonomously controlled actions in the simulation more closely resembles the result of the attempt to perform the one or more autonomously controlled actions.

10. The system of claim 9, wherein the simulation parameter is changed by at least:
determining a measure that represents a difference between the performance of the one or more autonomously controlled actions in the simulation and the attempt to perform the one or more autonomously controlled actions; and
determining a change to the simulation parameter based, at least in part, on a square of the measure.

11. The system of claim 6, wherein the one or more simulation parameters include a simulation parameter that represents friction.

12. The system of claim 5, further comprising the autonomous device, and
wherein the simulator includes:
a computer system with one or more processors; and
non-transitory computer-readable storage media to store instructions that, when performed by the one or more processors, cause the computer system to implement a model of the one or more autonomously controlled actions.

13. A non-transitory computer-readable storage medium having stored thereon executable instructions that, when performed by one or more processors of a computer system, cause the computer system to at least:
perform one or more simulations at least by iteratively adjusting a range of one or more simulation parameters representing one or more physical characteristics of one or more autonomously controlled actions of an autonomous device based, at least in part, on a measured range of the one or more physical characteristics.

14. The non-transitory computer-readable storage medium of claim 13, wherein the instructions, when performed by the one or more processors, further cause the computer system to:
adjust the one or more simulation parameters so that a result produced by a simulation governed by the one or more adjusted simulation parameters matches a result of an attempt to perform the one or more autonomously controlled actions in the real world.

15. The non-transitory computer-readable storage medium of claim 14, wherein a machine learning model is trained until the one or more autonomously controlled actions are successfully performed by the autonomous device.

16. The non-transitory computer-readable storage medium of claim 14, wherein:
the autonomous device is a self-driving car; and
the simulation models operation of the self-driving car.

17. The non-transitory computer-readable storage medium of claim 16, wherein the instructions, when performed by the one or more processors, further cause the computer system to determine a measure of road traction based, at least in part, on a simulation parameter of the one or more simulation parameters.

18. The non-transitory computer-readable storage medium of claim 13, wherein the instructions, when performed by the one or more processors, further cause the computer system to:
adjust a simulation parameter in the one or more simulation parameters based, at least in part, on differences between an attempt to perform the one or more autonomously controlled actions in the real world and a result of a simulation governed by the one or more simulation parameters.

19. The non-transitory computer-readable storage medium of claim 18, wherein the instructions, when performed by the one or more processors, further cause the computer system to obtain information that specifies: an allowable range of each simulation parameter in the one or more simulation parameters; and an initial value of each simulation parameter in the one or more simulation parameters.

20. The non-transitory computer-readable storage medium of claim 13, wherein the instructions, when performed by the one or more processors, further cause the computer system to:
obtain a first measure of a result of a simulation governed by the one or more simulation parameters;
obtain a second measure of a result of an attempt to perform the one or more autonomously controlled actions in the real world; and
modify the simulation based, at least in part, on a difference between the first measure and the second measure.

* * * * *